(12) United States Patent
Gharibi et al.

(10) Patent No.: US 12,288,157 B2
(45) Date of Patent: Apr. 29, 2025

(54) SYSTEMS AND METHODS FOR QUANTIFYING DATA LEAKAGE FROM A SPLIT LAYER

(71) Applicant: TripleBlind, Inc., Kansas City, MO (US)

(72) Inventors: Gharib Gharibi, Overland Park, MO (US); Andrew Rademacher, Kansas City, MO (US); Greg Storm, Parkville, MO (US); Riddhiman Das, Parkville, MO (US)

(73) Assignee: Selfiee Corporation, Alameda, CA (US)

( * ) Notice: Subject to any disclaimer, the term of this patent is extended or adjusted under 35 U.S.C. 154(b) by 0 days.

(21) Appl. No.: 17/592,072

(22) Filed: Feb. 3, 2022

(65) Prior Publication Data

US 2023/0306254 A1    Sep. 28, 2023

(51) Int. Cl.
  *G06N 3/08* (2023.01)
  *G06N 3/04* (2023.01)
(52) U.S. Cl.
  CPC ............... *G06N 3/08* (2013.01); *G06N 3/04* (2013.01)
(58) Field of Classification Search
  CPC .................................. G06N 3/08; G06N 3/04
  See application file for complete search history.

(56) References Cited

U.S. PATENT DOCUMENTS

| | | | |
|---|---|---|---|
| 1,045,208 A | 11/1912 | Spencer | |
| 5,410,696 A | 4/1995 | Seki et al. | |
| 6,353,816 B1 | 3/2002 | Tsukimoto | |
| 9,646,043 B1 | 5/2017 | Aronvich | |
| 10,002,029 B1 | 6/2018 | Bequet | |
| 10,362,001 B2 | 7/2019 | Yan | |
| 10,419,360 B2 | 9/2019 | Dawson | |
| 10,592,012 B2 | 1/2020 | Dawson | |
| 10,560,872 B2 | 2/2020 | Dawson | |

(Continued)

FOREIGN PATENT DOCUMENTS

| | | |
|---|---|---|
| WO | WO 2021/119365 | 6/2021 |
| WO | WO 2021/119367 | 6/2021 |

OTHER PUBLICATIONS

Chandra Thapa, "SplitFed: When Federated Learning Meets Split Learning", Submitted on Apr. 25, 2020 (v1), arXiv:2004.12088 [cs.LG] (Year: 2020).*

(Continued)

*Primary Examiner* — Oluwatosin Alabi
*Assistant Examiner* — Imad Kassim

(57) ABSTRACT

A system and method are disclosed for providing an artificial intelligence platform. An example method includes examining part of a global neural network to locate a split layer in the global neural network, creating an equivalent model to the part of the global neural network of a same size but having opposite operations, generating smashed data based on an operation on input data by the part of the global neural network, training the equivalent model by inputting the smashed data to generate a second a mirrored copy of the input data, quantifying a distance between the input data and the second generated set of mirrored data to yield a value and, when the value is below a threshold, determining that a current location of the split layer in the global neural network is safe for a training process.

20 Claims, 19 Drawing Sheets

(56) References Cited

U.S. PATENT DOCUMENTS

| | | |
|---|---|---|
| 10,594,623 B2 | 3/2020 | Dawson |
| 10,623,998 B2 | 4/2020 | Dawson |
| 10,833,871 B2 | 11/2020 | Ranellucci |
| 10,902,302 B2 | 1/2021 | Fu |
| 10,924,460 B2 | 2/2021 | Storm |
| 11,195,099 B2 | 12/2021 | Luo |
| 11,316,676 B2 | 4/2022 | Kinjo |
| 2006/0233377 A1 | 10/2006 | Chang |
| 2008/0082636 A1 | 4/2008 | Hofmann |
| 2008/0201721 A1 | 8/2008 | Little |
| 2009/0063485 A1 | 3/2009 | Schneider |
| 2010/0100864 A1 | 4/2010 | Plants |
| 2010/0281254 A1 | 11/2010 | Carro |
| 2011/0161091 A1 | 6/2011 | Freishtat |
| 2012/0047097 A1 | 2/2012 | Sengupta et al. |
| 2013/0124491 A1 | 5/2013 | Pepper |
| 2013/0272377 A1 | 10/2013 | Karczewicz |
| 2014/0108813 A1 | 4/2014 | Pauker |
| 2014/0371902 A1 | 12/2014 | McClelland |
| 2015/0242136 A1 | 8/2015 | Lin |
| 2015/0288662 A1 | 10/2015 | Bilogrevic |
| 2015/0324690 A1* | 11/2015 | Chilimbi ............... G06N 3/063 706/27 |
| 2015/0371132 A1 | 12/2015 | Gemello |
| 2016/0103901 A1 | 4/2016 | Kadav |
| 2016/0294550 A1 | 10/2016 | French |
| 2016/0335440 A1 | 11/2016 | Clark |
| 2016/0342608 A1 | 11/2016 | Burshteyn |
| 2017/0026342 A1 | 1/2017 | Sidana |
| 2017/0116520 A1 | 4/2017 | Min |
| 2017/0149796 A1 | 5/2017 | Gvili |
| 2017/0228547 A1 | 8/2017 | Smith |
| 2017/0323196 A1 | 11/2017 | Gibson |
| 2017/0359321 A1 | 12/2017 | Rindal |
| 2017/0372201 A1 | 12/2017 | Gupta |
| 2018/0039884 A1 | 2/2018 | Dalton |
| 2018/0041477 A1 | 2/2018 | Shaposhnik |
| 2018/0330237 A1 | 2/2018 | Yoshiyama |
| 2018/0129900 A1 | 5/2018 | Kiraly |
| 2018/0157972 A1 | 6/2018 | Hu |
| 2018/0227296 A1 | 8/2018 | Joshi |
| 2018/0367509 A1 | 12/2018 | O'Hare |
| 2019/0005399 A1 | 1/2019 | Noguchi |
| 2019/0065989 A1* | 2/2019 | Kida ............... G06N 3/048 |
| 2019/0130265 A1 | 5/2019 | Ling |
| 2019/0228299 A1 | 7/2019 | Chandran |
| 2019/0286973 A1 | 9/2019 | Kovvuri |
| 2019/0294805 A1 | 9/2019 | Taylor |
| 2019/0312772 A1 | 10/2019 | Zhao |
| 2019/0332944 A1 | 10/2019 | Bai |
| 2019/0372760 A1 | 12/2019 | Zheng |
| 2020/0036510 A1 | 1/2020 | Gomez |
| 2020/0044862 A1 | 2/2020 | Yadlin |
| 2020/0125933 A1 | 4/2020 | Aldea Lopez |
| 2020/0158745 A1 | 5/2020 | Tian |
| 2020/0184044 A1 | 6/2020 | Zatloukal |
| 2020/0186528 A1 | 6/2020 | Fan |
| 2020/0193279 A1* | 6/2020 | Hostetler ............... G06N 20/20 |
| 2020/0202184 A1 | 6/2020 | Shrestha |
| 2020/0226284 A1 | 7/2020 | Yin et al. |
| 2020/0228313 A1 | 7/2020 | Storm |
| 2020/0265301 A1 | 8/2020 | Burger |
| 2020/0286145 A1 | 9/2020 | Storm |
| 2020/0296128 A1 | 9/2020 | Wentz |
| 2020/0304293 A1 | 9/2020 | Gama |
| 2020/0322141 A1 | 10/2020 | Kinjo |
| 2020/0342288 A1 | 10/2020 | Xi |
| 2020/0342394 A1 | 10/2020 | Moore et al. |
| 2020/0372360 A1* | 11/2020 | Vu ............... H04L 9/0822 |
| 2020/0394316 A1 | 12/2020 | Boehler |
| 2020/0402625 A1 | 12/2020 | Aravamudan |
| 2021/0019605 A1 | 1/2021 | Rouhani |
| 2021/0026860 A1 | 1/2021 | Wang |
| 2021/0035330 A1 | 2/2021 | Xie |
| 2021/0064760 A1 | 3/2021 | Sharma |
| 2021/0117578 A1 | 4/2021 | Cheruvu |
| 2021/0142177 A1 | 5/2021 | Mallya |
| 2021/0150024 A1 | 5/2021 | Zhang |
| 2021/0157912 A1 | 5/2021 | Kruthiveti Subrahmanyeswara Sai |
| 2021/0194668 A1 | 6/2021 | Masters |
| 2021/0248268 A1 | 8/2021 | Ardhanari |
| 2021/0266170 A1 | 8/2021 | Rossi |
| 2021/0314140 A1 | 10/2021 | Stephenson |
| 2021/0334621 A1 | 10/2021 | Shimizu |
| 2021/0350357 A1 | 11/2021 | Lafontaine |
| 2021/0357859 A1 | 11/2021 | Malvankar |
| 2021/0374502 A1* | 12/2021 | Roth ............... G06N 3/08 |
| 2021/0385069 A1 | 12/2021 | Reid |
| 2021/0406386 A1 | 12/2021 | Ortiz |
| 2022/0004654 A1 | 1/2022 | Patel |
| 2022/0012672 A1 | 1/2022 | Inman |
| 2022/0038271 A1 | 2/2022 | Ranellucci |
| 2022/0050921 A1 | 2/2022 | LaFever |
| 2022/0051276 A1 | 2/2022 | Zelocchi |
| 2022/0108026 A1 | 4/2022 | Ortiz |
| 2022/0121731 A1 | 4/2022 | Growth |
| 2022/0247548 A1 | 8/2022 | Boehler |
| 2022/0300618 A1* | 9/2022 | Ding ............... G06F 21/60 |

OTHER PUBLICATIONS

Ads at al.("Multi-limb Split Learning for Tumor Classification on Vertically Distributed Data"), Date of Conference: Dec. 5-7, 2021, IEEE (Year: 2021).*

Gawali at al.("Comparison of Privacy-Preserving Distributed Deep Learning Methods in Healthcare", 2020) (Year: 2020).*

Khan et al. ("Security Analysis of SplitFed Learning", 2022): (Year: 2022).*

Abuadbba at al.("Can WeUseSplit Learning on 1D CNNModels for Privacy Preserving Training?", ASIA CCS '20, Oct. 5-9, 2020, Taipei, Taiwan (Year: 2020).*

Zhu et al. ("Deep Leakage from Gradients", NeurIPS 2019) (Year: 2019).*

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004.12088y, entire document.

Brisimi et al. "Federated learning of predictive models from federated electronic health records", International Journal of Medical Informatics, Apr. 2018, retrieved on Jan. 18, 2021 from http://www.ncbi.nlm.nih/gov/pmc/articles/PMC5836813/pdf/nihms936798.pdf.

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

Lui et al., "Federated Forest", Arxiv.org, Cornell University Library, May 24, 2019, XP081662771, DOI: 10.1109/TBDATA.2020.2992755, Sections 3, 4, 5; Figure 1. (Year: 2019).

Ads et al., "Multi-limb Split Learning for Tumor Classification on Vertically Distributed Data", Date of Conference: Dec. 5-7, 2021, IEEE (Year: 2021).

* cited by examiner

SYSTEMS AND METHODS FOR QUANTIFYING DATA LEAKAGE FROM A SPLIT LAYER

RELATED APPLICATION

The present application is related to U.S. patent application Ser. No. 17/180,475, filed Feb. 19, 2021, the contents of which is incorporated herein by reference.

TECHNICAL FIELD

The present disclosure generally relates to training neural networks and introduces new techniques for quantifying data leakage from a split layer specific to the Bling Learning approach for training neural networks on decentralized datasets.

BACKGROUND

There are existing approaches to training neural networks and that use a federated training approach or a centralized training approach. Each of the existing approaches to training neural networks is based on data and based on the location and the method by which the data is stored. The process in this context typically involves fully-connected networks and convolutional neural networks. There are other types of models that are available in the general context of machine learning or artificial intelligence. Split and blind learning are neural network learning paradigms for decentralized datasets. They are based on the idea of splitting the neural network into two parts and training over them by transferring the activations from one part into the other during the forward and backward propagation processes. However, the transferred activations (aka smashed data) can leak sensitive information about the training dataset if utilized by a malicious Server.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1:
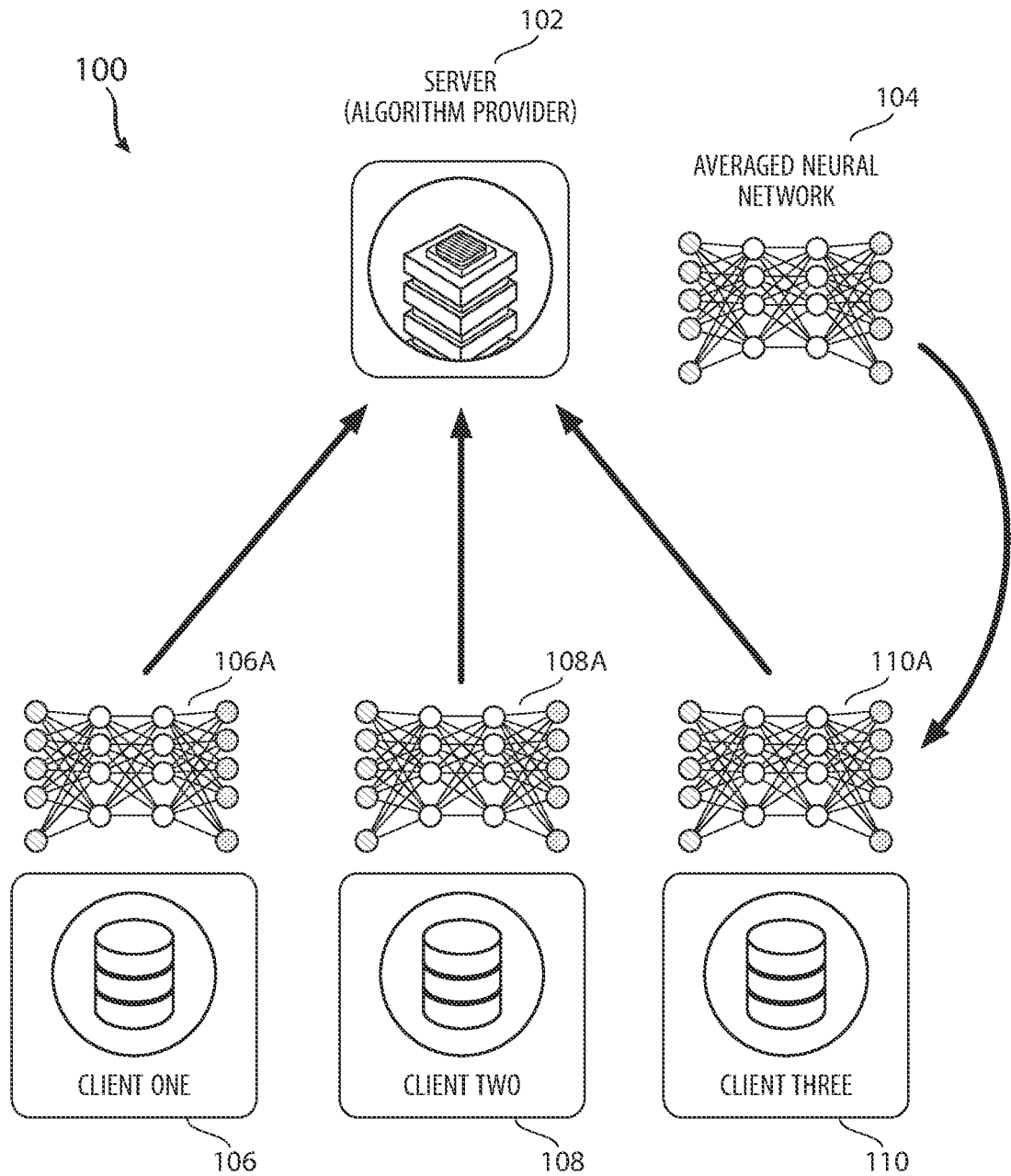
FIG. 1 illustrates a federated learning model training approach.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

In order to address the issue of data leakage in the context of split learning or blind learning approaches for neural network learning paradigms for decentralized datasets, this disclosure provides a statistical metric to quantify the amount of data correlation between a given set of smashed data and its corresponding input data. The metric measures the statistical distance between the original batch of training images (or data in general) and the images reconstructed using an attack network that operates on the activation values of the training images. Using this approach can provide insights into the sensitivity of a specific neural network and the amount of data leakage from the split layer-providing better insights for data owners when participating in decentralized learning tasks using split or blind learning methods. This disclosure first addresses some of the split and blind learning techniques for training neural networks and then focuses on the particular case of quantifying data leakage from the split layer associated with any number of different split or blind learning techniques.

Methods and systems that are disclosed that combine various approaches in order to train neural network models that keeps the data private that the models have been trained. The previous approaches can enable the training data to leak out or be discovered as part of the training process. The improved approach disclosed herein introduces both a split learning approach and built on top of that approach is a blind learning approach that provides a number of improvements. This disclosure then adds to these concepts the ability to include sequential models in the training process. The general approach of split learning and blind learning did not enable sequential models such as recurrent neural networks (RNN), a long short-term memory (LSTM) model or a gated recurrent units (GRU) model to be trained.

This disclosure will introduce various learning approaches including split learning and blind learning and then focus on the approach to enabling sequential models to be incorporated into such learning systems. In one aspect, a particular platform is used to enable a federated development or training of neural network models. The use of the disclosed platform for training models in this manner is disclosed as another embodiment herein. In yet another embodiment, data is encrypted as it is passed between a server and one or more client devices. Various types of federated learning (Shown in FIG. 1), split learning (shown in FIG. 2), and split-learning peer-to-peer (Shown in FIG. 3) are disclosed herein.

Typical federated learning involves passing a whole model from a server to a client device for training using the client data. The process can include using a number of different clients, each with their respective data, for training purposes. The approach is performed in a linear and iterative fashion in which the whole model is sent to the first client with data, then after training at the first client, the whole model is received back to the server for "averaging". Then whole updated model is sent to second client with data for additional processing. Then that updated model is sent back to the server for additional "averaging", and so on. In a split learning approach, the model is split and part is sent to each client but there still is a linear and interactive training process that is inefficient. The split-learning peer-to-peer approach also is performed linearly as peer clients share data in the linear process. Improvements in maintaining the privacy of data and efficiency in the training process are provided through the approaches disclosed herein.

This disclosure describes two improvements over federated learning and split learning. The first is a federated split learning or blind learning approach (shown in FIGS. 4-5) in which client side processing occurs in parallel and independent of other clients. The second disclosed approach (shown in FIGS. 6-10) relates to blind learning and a multi-modal artificial intelligence (MMAI) training approach to handle different types of data from different clients.

As noted above, a blind learning approach is disclosed as a variation on the typical federated learning approach above. A method in this regard includes splitting up, at a server, a neural network into a first portion and a second portion, and sending the second portion separately to a first client and a second client. The clients can have the data (MRIs, patient data, banking data for customers, etc.) and each receive a portion of the neutral network (a certain number of layers of the network up to a cut layer). The method includes performing the following operations until a threshold is met: (1) performing, at the first client and the second client, a forward step on the second portion simultaneously to generate data SA1 and SA2 (See FIGS. 1-4); (2) transmitting, from the first client and the second client, SA1 and SA2 to the server; (3) calculating, at the server, a loss value for the first client and the second client; (4) calculating, at the server, an average loss across the first client and the second client; (5) performing, at the server, backpropagation using the average loss and calculating gradients; and (6) sending, from the server, the gradients to the first client and the second client. This approach provides an improvement over the federated learning approach and the split learning approach by causing the processing on the client side (or the "data server" side) to operate in parallel and independent of each other. This approach also differs from the split learning peer-to-peer approach as well. The independent data servers send their activations up to the server side which aggregates, averages or otherwise processes the data depending on the network requirement to obtain the final trained model.

Another aspect of this disclosure relates to an improvement in developing an artificial intelligence model in which multiple different modes of data or types of data are available to be used for training. For example, different clients might have different types of data. One client might have images of X-rays or MRIs and another client may have text describing a patient's health condition. In this regard, a method can include splitting a neural network into a first client-side network, a second client-side network and a server-side network, sending the first client-side network to a first client. The first client-side network is configured to process first data from the first client, the first data having a first type. The first client-side network can include at least one first client-side layer. The method includes sending the second client-side network to a second client. The second client-side network is configured to process second data from the second client, the second data having a second type. The second client-side network can include at least one second client-side layer, wherein the first type and the second type have a common association.

The method can further include receiving, at the server-side network, first activations from a training of the first client-side network on first data from the first client, receiving, at the server-side network, second activations from a training of the second client-side network on second data from the second client, training at least one server-side layer of the server-side network based on the first activations and the second activations to generate gradients and transmitting the gradients from the server-side network to the first client-side network and the second client-side network. In this manner, multiple different types of data, having a common relationship such as being related to single patient or a single type or category of patient, are used to train the model.

Finally, the main focus of this disclosure is an approach to quantifying data leakage from a split layer associated with a blind learning, split learning or other technique.

An example method includes examining part of a global neural network to locate a split layer in the global neural network, creating an equivalent model to the part of the global neural network of a same size but having opposite operations, generating smashed data based on an operation on a first input data by the part of the global neural network, training the equivalent model by inputting the smashed data to generate a second input data (which can be a mirror image of the first input data), quantifying a distance between the first input data and the second input data to yield a value and, when the value is below a threshold, determining that a current location of the split layer in the global neural network is safe for a training process.

An example system includes a processor and a computer-readable storage device storing instructions which, when executed by the processor, cause the processor to perform operations including examining part of a global neural network to locate a split layer in the global neural network, creating an equivalent model to the part of the global neural network of a same size but having opposite operations, generating smashed data based on an operation on a first input data by the part of the global neural network, training the equivalent model by inputting the smashed data to generate a second input data, quantifying a distance between the first input data and the second input data to yield a value and, when the value is below a threshold, determining that a current location of the split layer in the global neural network is safe for a training process.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Disclosed herein is a new system, a platform, compute environment, cloud environment, marketplace, or any other characterization of the system that will enable an improved approach to training neural networks. In one aspect, the approach is called a federated-split or blind learning approach that combines features from known approaches but that provides a training process that maintains privacy for data used to train the model from various client devices. This disclosure first discusses in more detail the federated learning approach, follow by the split learning approach and a split learning peer-to-peer approach and then introduces the novel federated split-learning approach. Additionally, the multi-modal artificial intelligent (MMAI) learning approach for different types of data is introduced as well. The novel federated split-learning approach and the MMAI approach build on several models including those mentioned above. The application will review these first approaches in more detail and then introduce the two novel learning techniques.

Federated Learning

FIG. 1 illustrates the federated learning approach 100. This is an approach used by major companies now. A downside of this approach is that it proceeds "linearly" to one data provider at a time-rather than in parallel. The example neural network shown is a fully connected feed forward neural network that is being trained using a federated learning approach. The training process in this case includes a server 102 creating a model 104 and sharing the model 106A, 108A and 110A with respective clients 106, 108, 110 in a linear fashion. The clients train the respective model 106A, 108A, 110A separately when they receive the model on their turn and respectively send their trained model data back to the server 102 as shown. The server 102 averages the models and produces a new model 104 with updated weights (a.k.a a trained model). The server 102 sends the new model or weights to the respective clients 106, 108, 110 in a linear fashion. The process is repeated a number of iterations or until a specific accuracy is achieved.

In each iteration, the server 102 averages all participating models to create a trained model B. Thus, the server has a fully-trained model 104 at any point of time. The term "global model" refers to the model that results from the training process. The global model is a trained object that will be used for an inference task. An inference task might be to evaluate a medical image to classify whether the patient has cancer or a broken bone or some other medical condition.

An example of this approach being used, devices such as an electronic watch, or a mobile device, a device charging at night for example, and connected to a Wi-Fi network, could have its processor used to train neural network models. Thus, client 1 (106) could be an Apple watch, client 2 (108) could be another person's iPhone, and so forth. An example of a model is the Siri speech processing service offered by Apple. Every device is training the same model and the only difference is that the respective client is training on the data local to them. The model or data is transmitted back to the server 102 and the server averages the model together. The downside is that respective clients, such as client 1 (106), could be tricked into sharing something about the data being used to train the model. This would be a leakage of privacy data and raise the issued outlined above. The challenge of the federated learning approach is that there is no model privacy as the entire model is passed from client to client. There are high computational costs as each client processes the entire model, and a heavy communication overhead as the entire model is transmitted numerous times. A reconstruction attack can make training data venerable as well.

Split Learning

Figure 2:
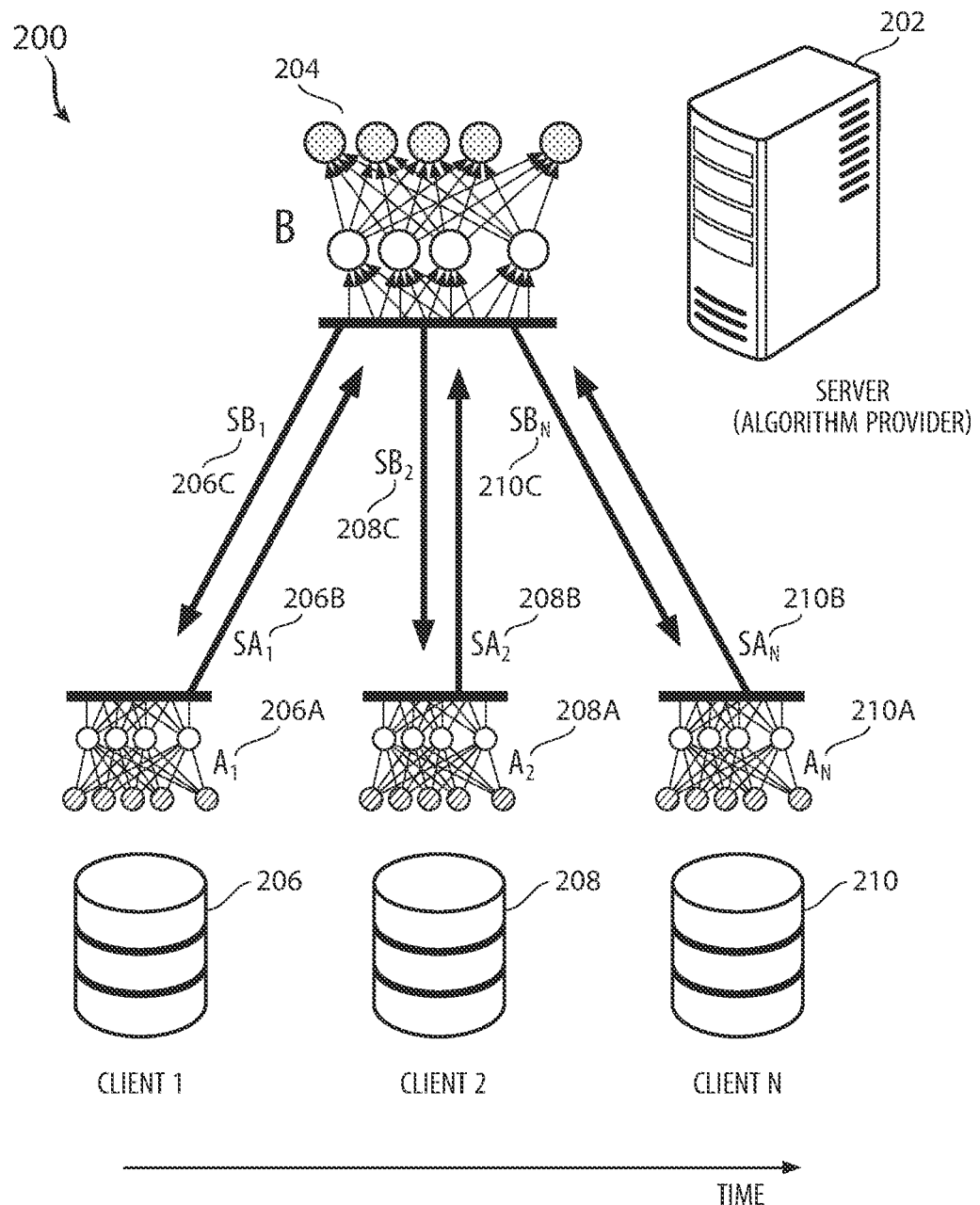
FIG. 2 illustrates a split learning centralized model training approach.

FIG. 2 illustrates a split learning centralized approach. A model (neural network) 204 is split into two parts: one part (206A, 208A, 210A) resides on the respective client side 206, 208, 210 and includes the input layer to the model and optionally other layers up to a cut layer, and the other part (B) resides on the server side 202 and often includes the output layer. Split layer(S) refers to the layer (the cut layer) where A and B are split. In FIG. 2, SA represents a split layer or data sent from A to B and SB represents a split layer sent from B to A.

In one example, the neural network between B 204 and client 1 (206) is the B portion 204 plus the A1 portion (206A) with the communication of data SB1 (206C) and SA1 (206B) to complete the entire neural network. The training process is as follows in this model. The server 202 creates A and B and sends a respective model A (206A, 208A, 210A) to the respective client 206, 208, 210. For every client, the operations include repeating the following in a linear or iterative fashion across the group of clients until some conditions occurs. The respective client 206, 208, 210 on their turn downloads the most recent model A from the server 202 (Note that this step is different between the approach shown in FIG. 2 and FIG. 3). The clients 206, 208, 210 in their respective turn do a forward step on the model A and sends the output of A (i.e., activations at S only or SA1 (206B), SA2 (208B), SAN (210B)) to the server 202 in addition to the required labels. The server 202 does a forward step on B using the SAs received from the respective client 206, 208, 210. The server 202 calculates the loss function and the server 202 does backpropagation and calculates gradients at the S layer. The server 202 sends the gradients of S only (i.e., SB1 (206C), SB2 (208C), SBN (210C)) to the respective client 206, 208, 210. This is process is performed linearly across the different clients such that the operations occur first for client 206, followed by client 208, and then client 210. The client 206, 208, 210 does backpropagation using the SB gradients received from the server 202 and the client 206, 208, 210 shares their updated A (SA1 (206B), SA2 (208B), SAN (210B)) with the server 202.

The horizontal axis in FIG. 2 is time such that the processing occurs in like a round-robin fashion from client to client.

In one example, network A1 206A on client 1 can include a convolution layer and an activation layer. Having processed data, the client 1 (206) sends the result of that layer forward (SA1 (206B)) to the next layer in the network, which is at the server 202, which calculates the backpropagation and so forth as outlined above. The B network repeatedly (in round robin fashion) processes the different data from the different clients 206, 208, 210. It will ultimately arrive at an averaged reflection of the network. It never trains the network on all the data from all the clients 206, 208, 210 at the same time. It can process data faster and have a benefit of B being averaged across the data as it is built. The final algorithm has not seen all the data. The model B cannot be tricked into revealing its data as it has never been trained on all of the data.

Split Learning in a Peer-to-Peer Environment

Figure 3:
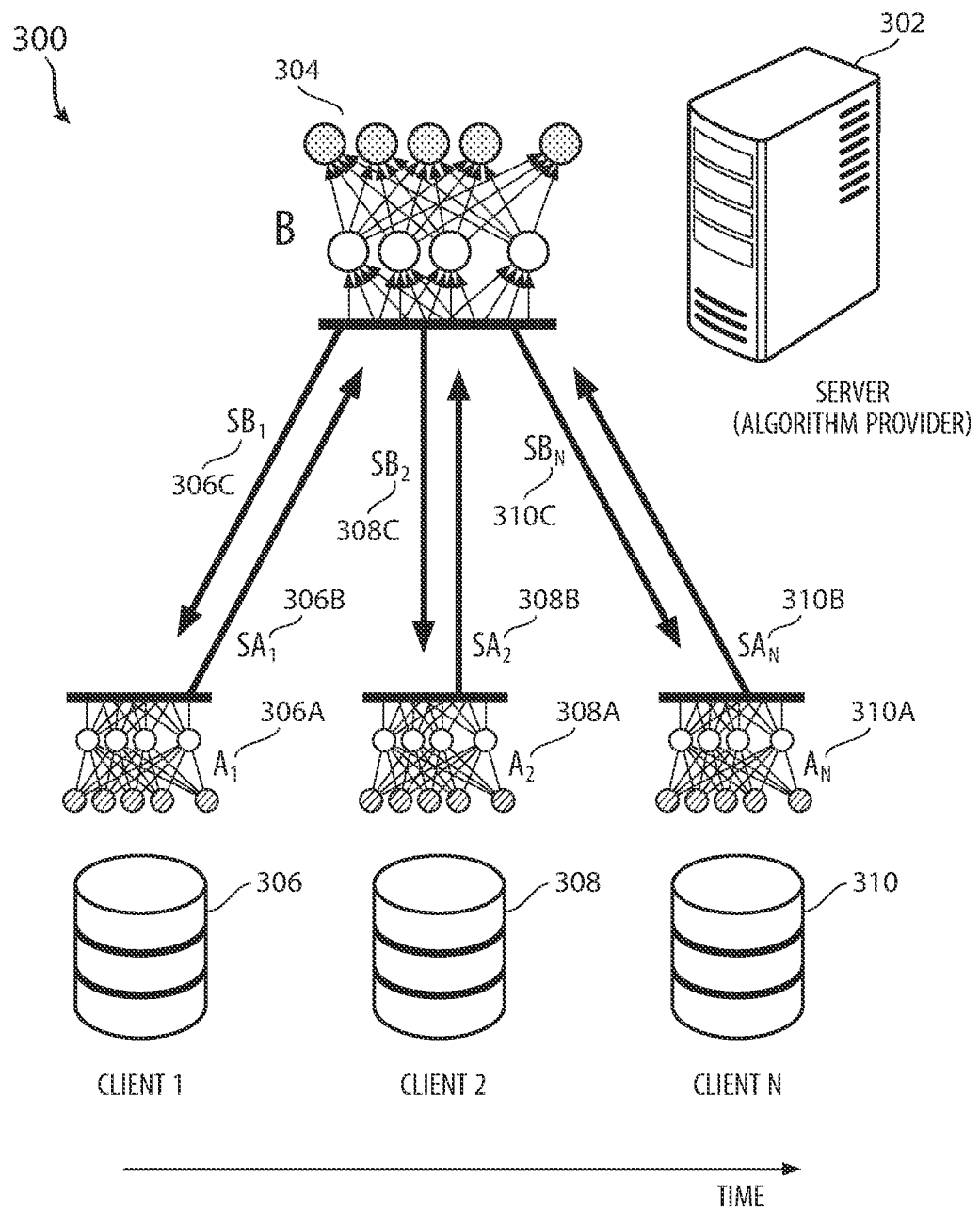
FIG. 3 illustrates a split learning peer-to-peer approach.

FIG. 3 illustrates a split learning peer-to-peer approach. A model (neural network) is split into two parts: one part (A) resides on the client side and includes the input layer, and the other part (B) resides on the server side and often includes the output layer. In FIG. 3, the client side part (A) is shown respectively as A1 (306A) at client 306, A2 (308A) at client 308, AN (310A) at client 310. A split layer(S) refers to the layer where A and B are split. In FIG. 3, SA represents a split layer sent from A to B and SB represents a split layer sent from B to A.

In one example, the neural network between B and client 1 306 is the B portion plus the A1 portion 306A with the communication of data SB1 306C and SA1 306B to complete the entire neural network. The training process is as follows in this model. The server 302 creates A and B and sends A to the clients 306, 308, 310. For every client, the process includes repeating the following until some conditions occurs. First, the process includes downloading the most recent A from a previous client.

Note that this step is different between the approach shown in other figures. The process then includes performing a forward step on A and sending the output of A (i.e., activations at S only) to the server 302 in addition to the required labels. The server 302 performs a forward step on B using the SA received from the respective client 306, 308, 310. The server 302 calculates a loss function and performs a backpropagation and calculates gradients at S. The server 302 sends the gradients of S only (i.e., SB) to the respective clients 306, 308, 310. The client does backpropagation using the SB gradients received from the server 302. The client shares their updated A with the server 302.

The peer-to-peer approach generally involves the respective client updating its A model by directly downloading it from a last trained client, or more broadly, by a previously trained client. In this regard, the process of training clients can occur in a round-robin fashion where the clients are trained sequentially. For example, if client 1 306 gets trained first, then in a peer-to-peer model, rather than client 2 308 updating its client-side model A2 from the server 302 or another trusted server, client 2 308 updates its client model A2 by downloaded the client side model A1 from client 1 306. The previously trained model can be the last trained client model or it could be a model from some other previously trained client based on some criteria. For example, client 1 306 and client 2 308 may have their respective models trained. Client 3 310 needs a client-side model update and might implement an algorithm or process to determine which client-side model to download between client 1 306 and client 2 308. Note that the disclosure below implements a multi-model artificial intelligence training process that could apply here. If client 1 306 processes images and its model A1 focuses on image processing, and client 2 308 processes text and its model A2 focuses on text processing, and client 3 310 processes images, then the algorithm or process could cause, in a peer-to-peer environment, the downloading of the client side model A1 to the client 3 310 as its update.

In one scenario, there is not enough information from split learning to achieve proper training of the neural network. It is assumed in this model that a good training approach could be that A and B are aggregated at the server 302 in plain text by simply stacking them (A and B).

Blind Learning

Figure 4:
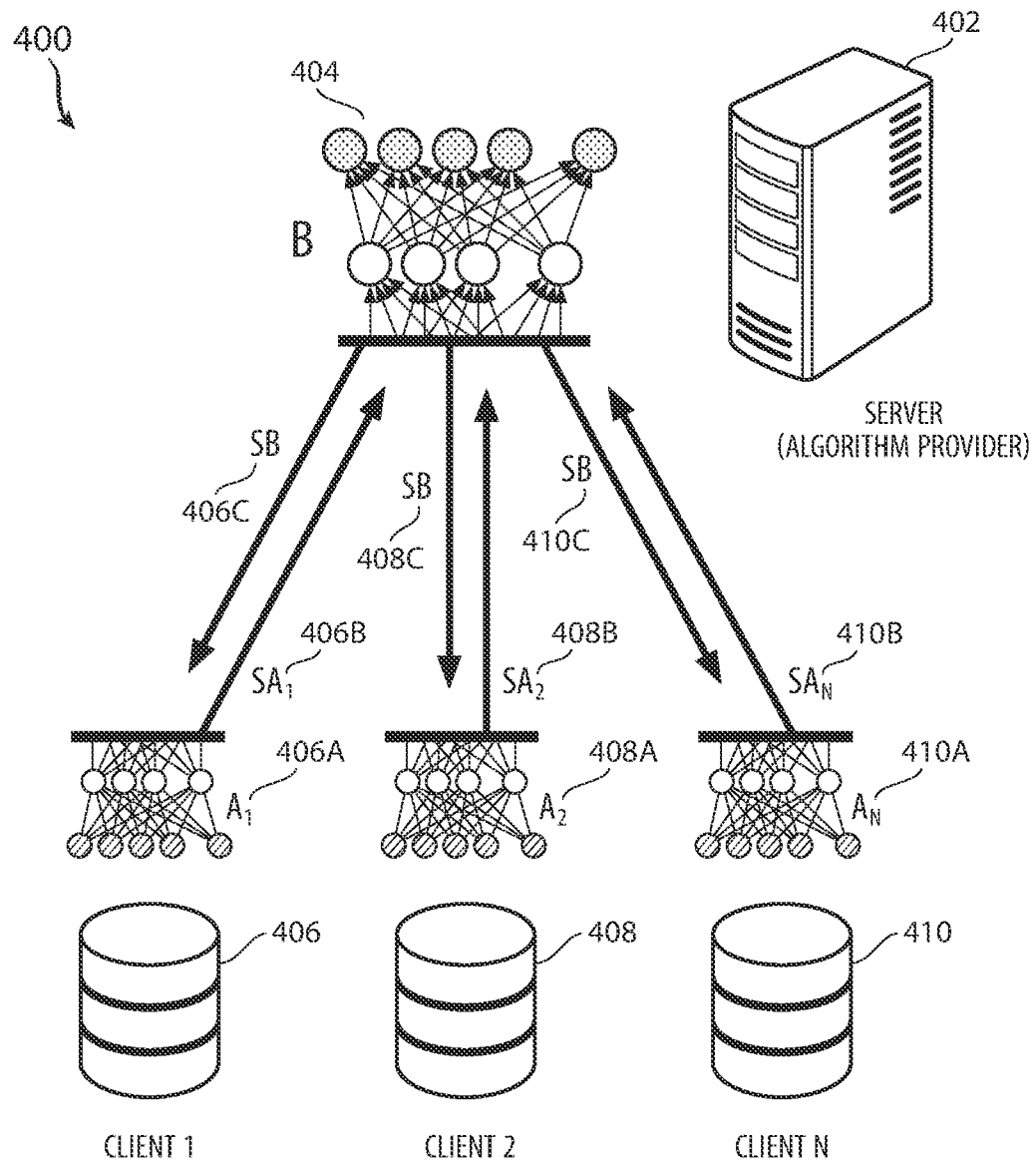
FIG. 4 illustrates a federated split learning approach.

FIG. 4 illustrates the improvement to training neural networks disclosed herein. This improvement can be characterized as a blind learning approach and addresses some of the deficiencies of the approaches disclosed above. FIG. 4 introduces a parallel processing approach. The parallel and independent processing causes the model training to occur at a faster pace than the other models described above.

The blind learning approach does not perform the round robin processing described above. The server 402 splits the network at the "split layer" which is a user parameter inserted into the network definition codes. The "top portion" of the network is kept at the server 402 the "bottom portion" is sent to the respective data providers or clients 406, 408, 410 (the terms clients and data providers are used interchangeably here). The training starts at the very lowest network layer which is the layer closest to the data. Each layer reads either the data (from the first layer) or the output of the previous layer (all other layers).

The layers can calculate their output (these are termed "activations" because they come from an activation function) based on any valid network architecture command (convolutions, dropouts, batch normalization, flatten layers, etc.) and activation function (relu, tanh, etc.). When the last layer on the data side 406, 408, 410 has calculated its appropriate activations (i.e., output) those outputs are sent to the first layer on "the other side of the split"—the first layer on the server side 402.

The following approach involves splitting the model up as before. A model is split into two parts: (A) on the client side and includes the input layer, and (B) on the server side and often includes the output layer. (S) is the split layer. The clients or data providers 406, 408, 410 run independently and send back the answer if they have it. The code on the server 402 processes the data and sends back its output equally to all the clients as SB (406C, 408C, 410C).

An example training process is as follows. The server 402 creates A and B and sends the portion A (406A, 408A, 410A) to the clients 406, 408, 410. The following steps are repeated until a condition is met (e.g., accuracy). All the clients 406, 408, 410 do the forward step on A simultaneously. Up to this point, all the calculations on the clients 406, 408, 410, are being done on independent servers and there is no dependency from one data server to the other. This approach highlights a one of the innovations disclosed herein. All these calculations by the clients/data providers 406, 408, 410 can all operate in parallel, at the same time. This is in contrast to the linear or "round robin" fashion discussed above.

The clients 406, 408, 410 each run their portion A (406A, 408A, 410A) of the neural network and generate a respective output of A (i.e., SA (406B, 408B, 410B) and send the output to the server 402. The server 402 receives 3 different 'versions' of the activations (one from each of SA1, SA2, SA3). At this point, the server 402 processes those activations "appropriately", which can mean that the server 402 does different operations depending on the case. For example, the server 402 calculates the loss value for each client 406, 408, 410 and the server 402 calculates the average loss across all clients. The server 402 performs backpropagation using the average loss and calculates gradients at S. The server 402 sends gradients at S (i.e., SB (406C, 408C, 410C)) to all the clients 406, 408, 410.

In other words, training on the server side 402 proceeds much like is described above. Once the first layer on the server side 402 is "complete" (either through averaging or aggregating what is received from the data providers 406, 408, 410) forward propagation occurs until the "top" of the network is reached. An additional innovation described in this disclosure is in the management of the activations coming from the data providers 406, 408, 410 and how they get averaged, aggregated or some other treatment. Once the system arrives at the top of the model, the server 402 calculates the gradients necessary for back propagation, and sends them back down and across the split networks as shown in FIG. 4.

As noted above, the processing and the management of the activations by the server 402 can vary depending on different factors. For example, assume a case where all three data providers 406, 408, 410 are supplying the same data (X-rays). In that case, the data will be combined horizontally which can conceptually mean that the data is "stacked" one file on top of the other. In this case, the activations that come up will most likely be averaged. The "average of each activation" will then be sent forward into the "top half" of the network.

In a different case, the data can be "vertically" stacked, so Client 1 406 has the first 40 columns of data (say a blood test), Client 2 408 has the next 60 columns of data (say an Electronic Health record that includes data such as age, weight, etc.) and Client 3 410 has the last 100 columns of data (say insurance information-previous claims, etc.). In this instance, the three clients can be considered as establishing a combined "record" of 200 columns (aggregated vertically across the page). In this case, the activations will be "combined vertically" and sent forward into the server network. This and other approaches to combining data can be implemented. Note that the multi-model artificial intelligence model described more fully below builds upon the concept just described with respect to combining vertically the activations. More details will be provided below on this concept.

As noted above, the clients 406, 408,410 run in parallel in this embodiment. This reduces the time it takes to train the model—as all the processing is done in parallel. Further, this data is delivered over a particular platform. The applications incorporated above provide examples of the particular platform that can be used to deliver the data as disclosed herein. This will be discussed more below.

A global model in federated-split learning can be aggregated as follows. After the training is done, the system uses on the following approach to aggregate a global model, which will be used for the inference task. In a first approach, the server selects one of the models, Ai, to be aggregated with its model, B, to form the global model. The selection of Ai could be achieved using one of the following ways. For example, random selection could be used where the server selects a model (Ai) of any client 406, 408, 410 randomly. This random selection might be influenced by other factors, such as the currently available clients online, the types of data each client processes (text data, image data, temporal data) or based on the transmission speed or network delay between the two entities. The server then stacks both parts Ai and B to generate the global model.

In another example, a weighted client selection could be used. For this selection criteria, the server 402 assigns each client a weight (i.e., a numerical value) that reflects their importance based on their data, computational powers, and other valuable assets they possess and contribute during the training process. For example, a particular model set (say data for a certain language, data associated with a type of image, data associated with a patient set, or data from a particular country or region) could get weighted heavily in the model development. Thus, if a country is selected, then the client devices from that country can be weighted more heavily than clients from other countries. Japanese-based client devices can be used for 80% of the model data, for example. Australia could be 10% and Canada could be the other 10%. In another example, data from a certain clinic associated with an outbreak of the flu or COVID could be weighted more heavily. In yet another example, the type of data might be weighted more heavily as well. Image data may be used for 70% of a model, while textual data for 20% and temporal data for 10%.

Yet another model could be an accuracy-based selection. In this case, the server 402 can test the accuracy generated from each client model Ai and then select the model that generates the "best" accuracy. The "best" can be identified by stakeholders, through a machine learning approach, or otherwise. These are all models of the first approach.

A second approach can be where the global model is aggregated by averaging all clients' models Ai $\{1, N\}$. Each client first encrypts their model using homomorphic encryption and then sends the encrypted Ai' data to the server 402. The server 402 adds all the encrypted models, decrypts the addition results, and then calculates their average. The averaged A is then stacked with B to generate a global model. One approach could be a default approach, and optional approaches could be provided as well. The decryption processes and averaging process could also be spread between different servers, for example, with one process occurring on the client side and another process being performed by the server 402 to achieve the global model.

The approaches may vary through the development of the model. For example, the model may begin to be trained using a default approach and then the training could be adjusted such that a weighted approach is used to complete the model training.

Figure 5:
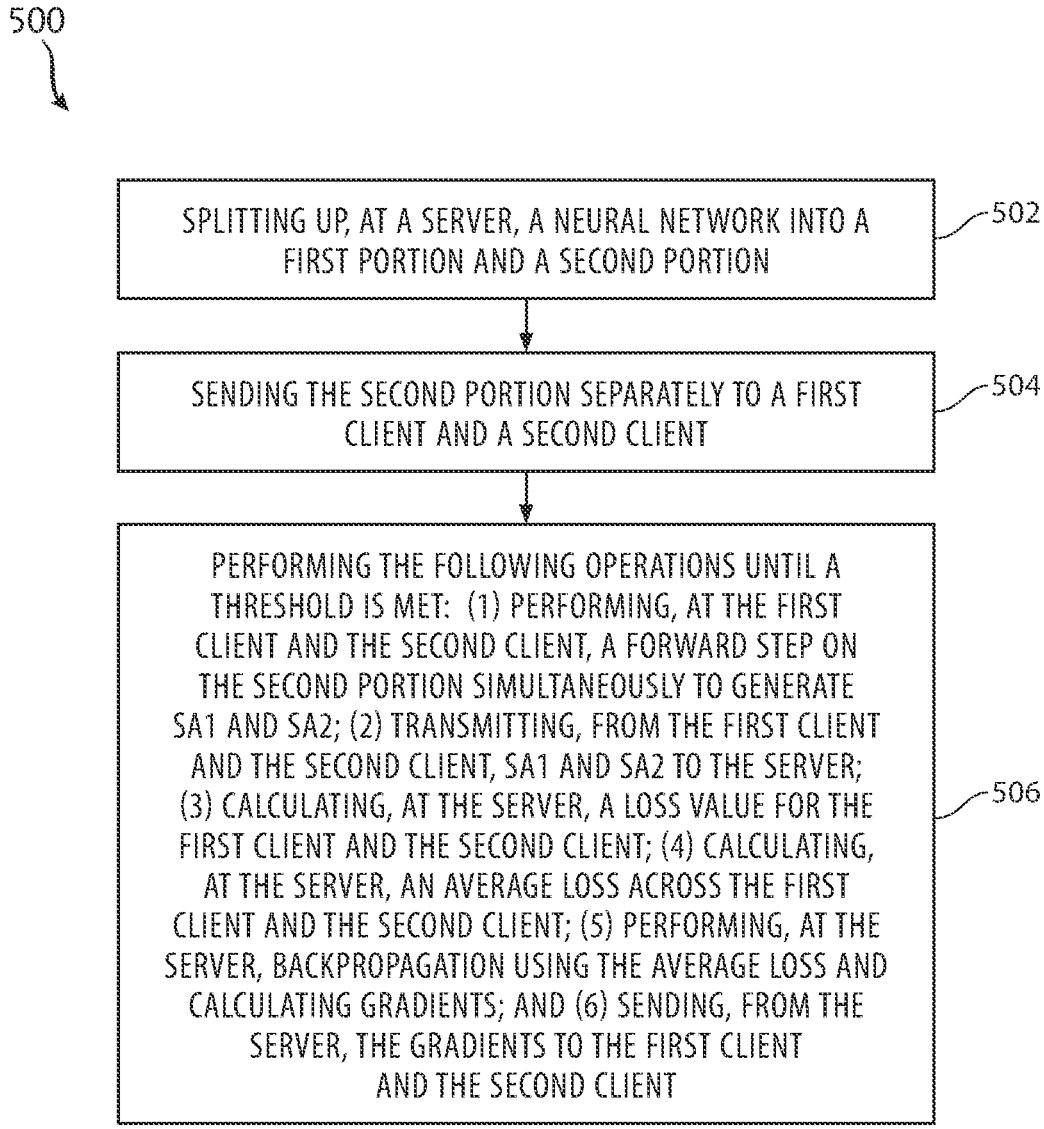
FIG. 5 illustrates an embodiment related to blind learning.

A method example is shown in FIG. 5 and can include splitting up, at a server, a neural network into a first portion and a second portion (502), sending the second portion separately to a first client and a second client (504) and performing the following operations until a threshold is met:
  (1) performing, at the first client and the second client, a forward step on the second portion simultaneously to generate data SA1 and SA2;
  (2) transmitting, from the first client and the second client, SA1 and SA2 to the server;
  (3) calculating, at the server, a loss value for the first client and the second client;
  (4) calculating, at the server, an average loss across the first client and the second client;
  (5) performing, at the server, backpropagation using the average loss and calculating gradients; and
  (6) sending, from the server, the gradients to the first client and the second client (506).

A computing device or devices performing the above operations can also be covered as well as a computer-readable storage device storing instructions which, when executed, cause the processor to perform these operations. The operations can be performed in any order and the method can include one or more of the operations.

In another aspect of this disclosure, the platforms described in the patent applications incorporated above can provide the basis for communicating data back and forth in any of the federated models. For example, each of the clients and/or the server as well may be required to be logged onto a platform or one of the versions of the platform referenced in the applications incorporated herein. Therefore, delivering this functionality over a platform or an exchange configured as disclosed in these applications is also covered as an aspect of this disclosure.

In another aspect, a customer could choose SA, SB lines (vectors and numbers) which represent weights that need to be propagated. If a client wanted their data to be locked down without the server knowing anything about the data, that data can be homomorphically encrypted. The encryption process (which can include any encryption process) could be used in any approach disclosed above.

The incorporated patent applications above provide example platforms that client devices and/or servers can log into or may be required to be logged into in order to perform the federated-split learning approach disclosed herein.

It is noted that in one aspect, the steps disclosed herein can be practiced by a "system." The system can include the server and one or more clients together or might just be functionality performed by the server. The system could also be a client or a group of clients, such as clients in a particular geographic area or clients groups in some manner that are performing the client-based functions disclosed herein. In one aspect, the "server" can also be a computing device (physical or virtual) on the server side as well as a computing device (physical or virtual) on the client side. In one example, a server can be on the client side and can receive back-propagation output of the respective client-side models Ai and can synchronize a client-side global model in a round of training.

Thus, each of the server side system and the client side system can perform any one or more of the operations disclosed herein. Claims can be included which outline the steps that occur from the standpoint of any device disclosed herein. For example, the steps of transmission, calculation, and receiving of data can be claimed from the standpoint of a server device, a client device, or group of client devices depending on which embodiment is being covered. All such communication from the standpoint of an individual component or device can be included as within the scope of a particular embodiment focusing on that device.

In another aspect, the system can include a platform as disclosed in the patent applications incorporated by reference also performing steps in coordination with the concept disclosed above. Therefore, the platform as used to provide the federated-split learning process described herein is also an embodiment of this disclosure and steps can be recited in connection with the use of that platform for training models in a manner that maintains privacy of the data as described herein.

Typically, the training of a neural network is performed on similar data types. For example, a neural network trained to identify cancer by receiving a patient image or a kidney is trained on images of kidneys that are and are not cancerous. Next is discussed a new approach to training which uses different types of training data together to train a neural network, using the blind learning approaches disclosed herein.

Multi-Model Artificial Intelligence Approach

As mentioned above, the MMAI innovation builds on the "vertical aggregation" idea described in an example of blind learning. The example related to all three clients 406, 408, 410 providing the same type of data-either images (for stacking) or tabular data to be combined vertically. When the inventors were considering the vertical aggregation concept, they realized that this could be done with different types of data. For example, Client 1 could provide images, Client 2 could provide a blood test, and Client 3 could provide doctors textual notes. The significant difference is all of those data types require different network architectures. In this case, the developers of the system can't define one network and then let the server "split" it. Thus, part of the solution is to let the users define the network "before the split" for each data provider, and then define the network and aggregation technique on the server. This approach is illustrated in FIGS. 6-10.

Figure 6:
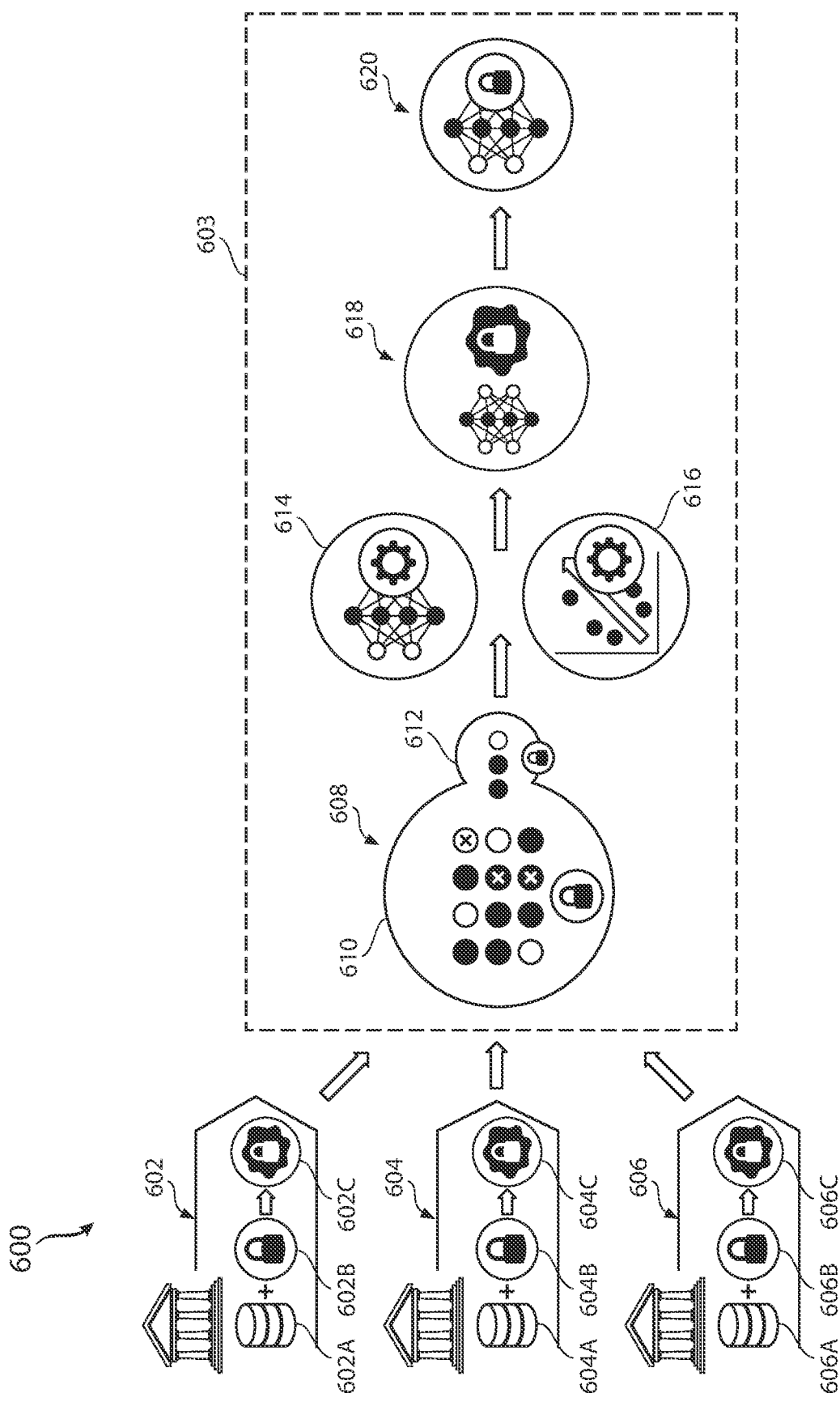
FIG. 6 illustrates a multi-modal artificial intelligence (MMAI) platform or a machine learning (ML) platform.

FIG. 6 illustrates the multi-modal artificial intelligence (MMAI) platform or a machine learning (ML) platform 600. The MMAI approach reduces the computational requirements and communication overhead of other approaches. Additionally, the training speed is much faster and the process maintains a much higher privacy in the data, including the fact that the model stays private as well.

The MMAI platform 600 applies AI/ML techniques to multiple data types in one large AI model. Typically, different data types require different AI network architectures to yield accurate results. Images, for example, typically require special filters (convolutions), whereas text or speech require different "time series-like" treatment, and tabular data frequently works best with ML or feed forward architectures. The issue is that images are best understood by looking at all of the pixels together and "convoluting" them in various ways, whereas speech is best understood in the context of what came before and/or after a certain sound (i.e. in a manner similar to time-series data), etc. Because of these differences in processing, "state of the art" systems today typically process one data type (i.e. images, text, speech, tabular, etc.).

Most AI researchers recognize that breakthroughs in "next generation" accuracy can be achieved by adding more unique data to their models. This is essentially the equivalent to providing more data to the model to give it more context with which to discover interesting differences in cases. An example of this concept is a model that diagnoses Atrial Fibrillation (A-fib) by examining ECG (electro-cardiogram) data. The model can reach a certain level of accuracy based on the ECG data alone, but when the researchers add age, sex, height and weight to the ECG data, the model becomes far more accurate. The increase in accuracy is due to the four additional data types being able to help the model better understand what would otherwise look to the model like "equivalent" ECGs. Adding the four items or characterizations of the data can make the data more granular.

The MMAI platform 600 shown in FIG. 6 introduces a new generation crypography toolset to improve the training and protection of private data. The MMAI platform 600 provides the model with more data than is typically used to train AI/ML models and expands on the data. The approach adds a significant amount of data by combining different data types—i.e. images and tabular data, for instance.

FIG. 6 illustrates a first outside source of data 602, which is shown as Wells Fargo bank. The Wells Fargo data 602a is encrypted 602b and the package of encrypted data 602c is transmitted to a private AI infrastructure 603. A second outside source of data 604 is shown as Citibank. The Citibank data 604*a* is encrypted 604*b* and the package of encrypted data 604*c* is transmitted to the private AI infrastructure 603. A third outside source of data 606 is shown as from Bank of America. The Bank of America data 606*a* is encrypted 606*b* and the package of encrypted data 606*c* is transmitted to the private AI infrastructure 603. The AI infrastructure 603 includes a first module 608 that will privately explore, select and preprocess all of the data 610 from the disparate sources 602, 604, 606. In this example, all of the sources are identified as banks but they will have different structures for their data, and the respective data can be disparate as well. Of course, it is not a requirement that all of the outside sources 602, 604, 606 of data be of the same type, i.e., banks. The use of banks is just an example. The outside sources 602, 604, 606 could be, for example, a hospital, a clinic, a university, and so forth. The basic concept is that the data types can be different from the various different outside sources 602, 604, 606.

The private AI infrastructure 603 can include a component that privately explores, selects and preprocesses the relevant features from all of the data 602*c*, 604*c*, 606*c* it receives for training. Feature 612 represents the subset of the data 610 which can result from the processing of the component in the private AI infrastructure 603. In operations 614, 616, the AI infrastructure 603 privately trains new deep and statistical models on the selected data 612 and in operation 618 will predict on any private and sensitive data, which can include images, video, text and/or other data types. The AI infrastructure 603 can then sell or grant access to the new models which is presented in operation 620.

Figure 7A:
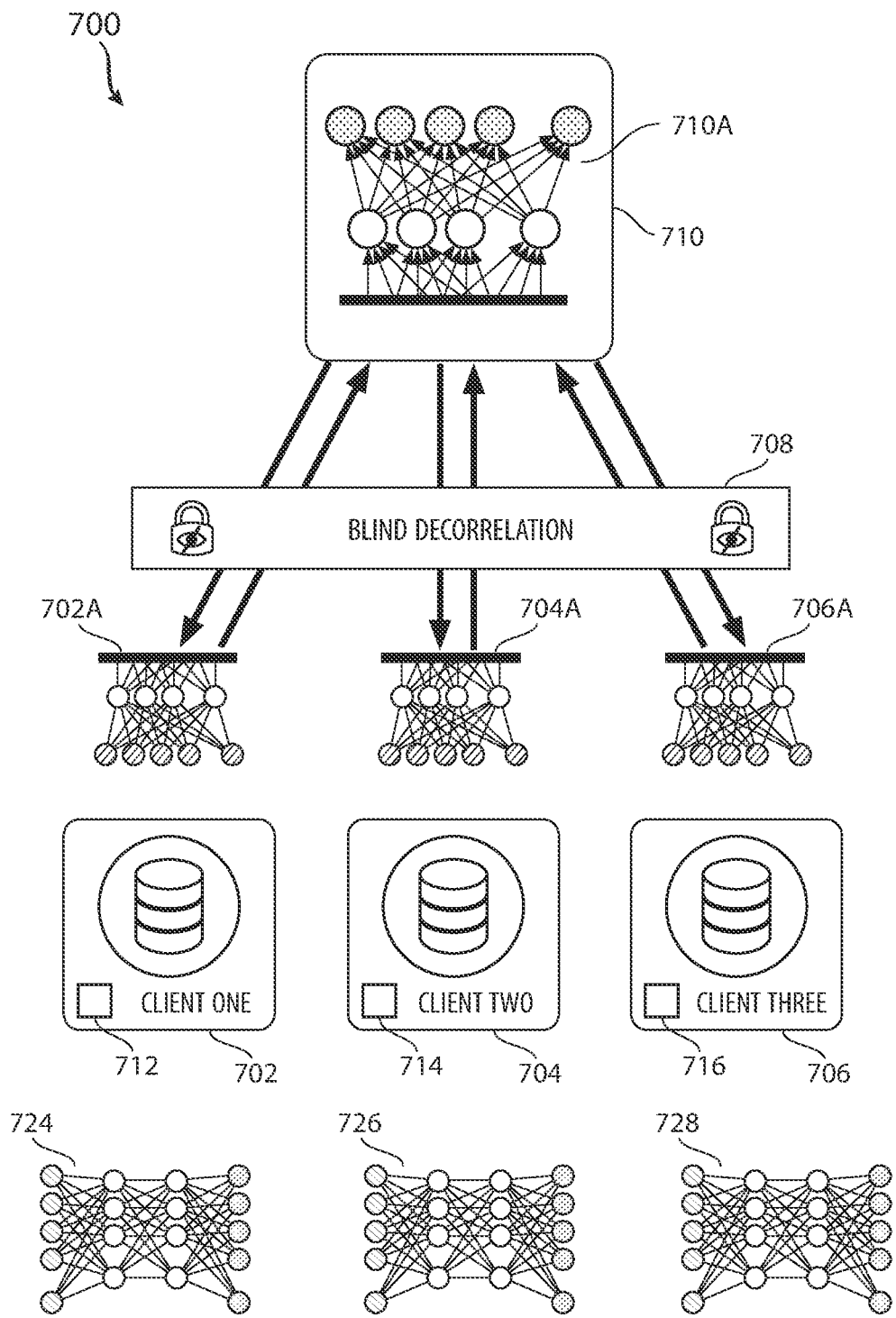
FIG. 7A illustrates how blind correlation works across multiple clients.

FIG. 7A illustrates another variation on the split learning technique 700. This approach provides low compute requirements and low communication overhead to improve the training of models by using a blind correlation process for training based on disparate types of data. Building on the A-fib model example above, another source of even more data for the model would be to include a chest X-ray for each case the model considers. Unfortunately, the typical processing of the X-ray image is not consistent with the typical processing of the tabular ECG data. With a few minor engineering additions, the above-disclosed split-federated learning tool can be used to address this incompatibility problem. Namely, new instructions can be provided to the tool to allow different data types to process in the existing pipeline.

In this case rather than an "automatic" split of the network architecture this variation on the idea allows the network architect (i.e. the data scientist developing the algorithm) to specify the specific network components desired for each data type. Each data type will need network architecture layers relevant to its data type (i.e. convolutional layers for images, Recurrent layers/Long Short Term Memory layers for speech, feed forward layers for tabular data, etc.). These disparate layers, each specific to the data type in question, will be specified such that they run on the "data server" side (almost like independent networks in and of themselves). The last layer of each "independent network" (per data type) will send it's activations "across the split" to the "server side". The algorithm server side will have one consistent "network" that processes the incoming activations (from the data server side) appropriately. In some respects this approach is similar to an "ensemble of networks" (on the data server side) being aggregated into one final network on the algorithm server side (which ultimately produces the final "answer" from the "ensemble" of networks).

Split learning is a collaborative deep learning technique, where a deep learning network or neural network (NN) can be split into two portions, a client-side network A and a server-side network B, as discussed above. The NN includes weights, bias, and hyperparameters. In FIG. 7A, the clients 702, 704, 706, where the data reside, commit only to the client-side portion of the network, and the server 710 commits only to the server-side portion of the network 710A. The client-side and server-side portions collectively form the full network NN.

The training of the network is done by a sequence of distributed training processes. The forward propagation and the back-propagation can take place as follows. With the raw data, a client (say client 702) trains the client-side network 702A up to a certain layer of the network, which can be called the cut layer or the split layer, and sends the activations of the cut layer to the server 710. The server 710 trains the remaining layers of the NN with the activations that it received from the client 702. This completes a single forward propagation step. A similar process occurs in parallel for the second client 704 and its client side network 704A and its data and generated activations which are transmitted to the server 710. A further similar process occurs in parallel for the third client 706 and its client side network 706A and its data and generated activations which are transmitted to the server 710.

Next, the server 710 carries out the back-propagation up to the cut layer and sends the gradients of the activations to the respective clients 702, 704, 706. With the gradients, each respective client 702, 704, 706 performs back-propagation on the remaining network 702A, 704A, 706A. This completes a single pass of the back-propagation between a client 702, 704, 706 and the server 710.

This process of forward propagation and back-propagation continues until the network gets trained with all the available clients 702, 704, 706 and reaches its convergence. In split learning, the architectural configurations are assumed to be conducted by a trusted party that has direct access to the main server 710. This authorized party selects the ML model (based on the application) and network splitting (finding the cut layer) at the beginning of the learning.

As noted above, a concept introduced in this disclosure relates to the clients 702, 704, 706 each providing a different type of data but also where the different types of data have a common association. Thus, the selection of the machine learning model can be based on the types of data that are being processed on the client side, and the process of finding the cut layer can also depend on what types of data or the disparity in the different types of data. For example, for widely disparate data types across the clients 702, 704, 706, the cut layer may be chosen to have more or less layers on the client-side networks 702A, 704A, 706A. In another aspect, the number of layers before the cut layer or split layer may vary across clients. Client 702 may be processing images and require 8 layers before the cut layer, while client 704 may process text and only need 4 layers before the cut layer. In this regard, as long as the vectors, activations or activation layer at the cut layer is consistent across the different clients 702, 704, 706 having different types of data, there is no requirement that the number of layers at the client-side networks 702A, 704A, 706A be the same.

The synchronization of the learning process with multiple clients 702, 704, 706 can be done either in centralized mode or peer-to-peer mode. In the centralized mode, before starting training with the server 710, a client 702, 704, 706 updates its client-side model 702A, 704A, 706A by downloading the model parameters from a trusted third-party server 710, which retains the updated client-side model uploaded by the last trained client. On the other hand, in peer-to-peer mode, the client 702, 704, 706 updates its client-side model by directly downloading it from the last trained client. As noted above, previously-trained models may have a data type similarity to a current client that needs to update its model. For example, the similarity may be based on the data be images, textual data, speech data, video data, temporal data, and so forth. Thus, there may be an intelligent selection of which previously-trained client model to use to download from a peer. The processing by the server 710 can also be split in some cases between some processing on the server side and other processing at a federated server on the client side.

As introduced above, client one 702, client two 704 and client three 706 could have different data types. The server 710 will create two parts of the network and sends one part 702A, 704A, 706A to all the clients 702, 704, 706. The system repeats certain steps until an accuracy condition or other condition is met, such as all the clients sending data to the part of the network that they have, and sends the output to the server 710. The server 710 calculates the loss value for each client and the average loss across all the clients. The server 710 can update its model using a weighted average of the gradients that it computes during back-propagation and sends the gradients back to all the clients 702, 704, 706. The clients 702, 704, 706 receives the gradients from the server 710 and each client 702, 704, 706 performs the back-propagation on their client-side network 702A, 704A, 706A and computes the respective gradients for each client-side-network 702A, 704A, 706A. The respective gradients from the client-side networks 702A, 704A, 706A can then be transmitted back to the server 710 which conducts an averaging of the client-side updates and sends the global result back to all the clients 702, 704, 706.

It is noted that the server 710 functionality can be also broken into several servers that each perform the different operations (such as updating its model by one server and averaging the local client updates by another server, each located in different areas). In the case of FIG. 7, the clients 702, 704, 706 all process disparate types of data which normally would or could not be processed to develop an AI model.

For example purposes, the A-fib model from above can be used to illustrate the process. Client one 702 could have ECG data, client two 704 could have X-ray data, and client three 706 could have genetic data. Client one 702, for example, could be a hospital, client two 704 could be a medical diagnostics imaging company and client three 706 could be a bank or financial institution, in a manner depicted in FIG. 6. One of the clients could also have time-based data such as progressive information about the patient relative to weekly visits to the hospital for checkups.

The approach shown in FIG. 7A illustrates how the system can implement new user instructions that allow a user to bring different data types together with the "correct" processing before the split or cut layer or as shown in the blind decorrelation block 708. Each of those parts of the model can be independent, and will operate independently. In one aspect, the processing performed by the blind correlation block 708 will result in an activation layer or activations that are transferred to the server 710. This approach is similar to the approach described above with the addition of the differences in data type amongst the clients 702, 704, 706.

The server 710 will combine those activation layers in one of a multitude of ways. The server 710 can average them (which is also described above), but it could also concatenate them into one long activation layer. In another aspect, the server 710 could apply any mathematical function to achieve the desired combination of the activation layers. The server 710 can then process the combined activation layers further using any appropriate network architecture. In one aspect, a server on the client side can receive gradients and average the gradients to generate a global model of the various clients 702, 704, 706 and send the global model to the server 710 for concatenation or for further processing.

The ideas shown in FIGS. 6 and 7A represent an expansion and application of the split-federated learning tool set and provides a platform of off-the-shelf tools to bring disparate data types together into a superset AI model. The processing can be done all privately and the offering can also be included in a marketplace as described in the incorporated patent applications referenced above.

Not only can the system combine different data types, but the system can also combine different AI/ML techniques. For example, client one 702 can be a CNN (convolutional neural network), client two 704 can be an ML routine (i.e. XGBoost), and client 3 706 can apply a different technique as well. In this regard, although the different AI/ML techniques are different, as long as the resulting data at the cut layer is consistent and properly configured, the forward propagation and back propagation can occur and the models can be trained.

In order to assist one of skill in the art to understand how the MMAI approach might work, the following is an example of actual commands per data type coming from the three data providers 702, 704, 706. This code uses the python numbering convention so it starts with builder0 (tabular data from data provider 1 702). Builder1 in this example is for a CT Scan or image data. The commands would be similar for Xray, MRI, and/or any other picture. Builder2 (from data provider 704) is text data. Note the "lstm" command, which is short for "long/short term memory". The "server" builder commands define the network that aggregates the other three at the "top" on the other side of the split.

```
builder0=tb.NetworkBuilder( )
builder0.add_dense_layer(100, 120)
builder0.add_relu( )
builder0.add_dense_layer(120, 160)
builder0.add_relu( )
builder0.add_dropout(0.25)
builder0.add_dense_layer(160, 200)
builder0.add_relu( )
builder0.add_split( )
builder1=tb.NetworkBuilder( )
builder1.add_conv2d_layer(1, 32, 3, 1)
builder1.add_batchnorm2d(32)
builder1.add_relu( )
builder1.add_max_pool2d_layer(2, 2)
builder1.add_conv2d_layer(32, 64, 3, 1)
builder1.add_batchnorm2d (64)
builder1.add_relu( )
builder1.add_max_pool2d_layer(2, 2)
builder1.add_flatten_layer( )
builder1.add_split( )
builder2=tb.NetworkBuilder( )
builder2.add_lstm_layer(39, 100, batch_first=True)
builder2.add_dense_layer(100, 39)
builder2.add_split( )
server_builder=tb.NetworkBuilder( )
``` server_builder.add_dense_layer(60000, 8000),
server_builder.add_relu( )
server_builder.add_dense_layer(8000, 1000),
server_builder.add_relu( )
server_builder.add_dense_layer(1000, 128),
server_builder.add_relu( )
server_builder.add_dense_layer(128, 1)

FIG. 7A shows additional features such as where each client includes a tool 712, 714, 716 that can be used for quantifying data leak at a split layer 702B, 704B, 706B of each respective part of the global neural network 702A, 704A, 706A. As shown, there is a respective attack network 724, 726, 728 that can be generated for all the clients or for each respective client 702, 704, 706 and that is used to receive smashed data and generate or attempt to generate the original data provided to the respective parts 702A, 704A, 706A of the neural network on the clients 702, 704, 706. In another aspect, a single attack network such as attack network 724 for all the clients 702, 704, 706. Note that the tool 712, 714, 716 can be on one or more of the clients 702, 704, 706 and can be operative as well on any one or more of the clients 702, 704, 706. In other words, it is not a requirement of this disclosure that the tool be loaded or operative on all of the clients. It may only be configured upon or operative on selective clients based on any number of parameters. More detailed operations of the tools and how they are used to quantity data leakage are discussed next in connection with FIG. 7B.

Figure 7B:
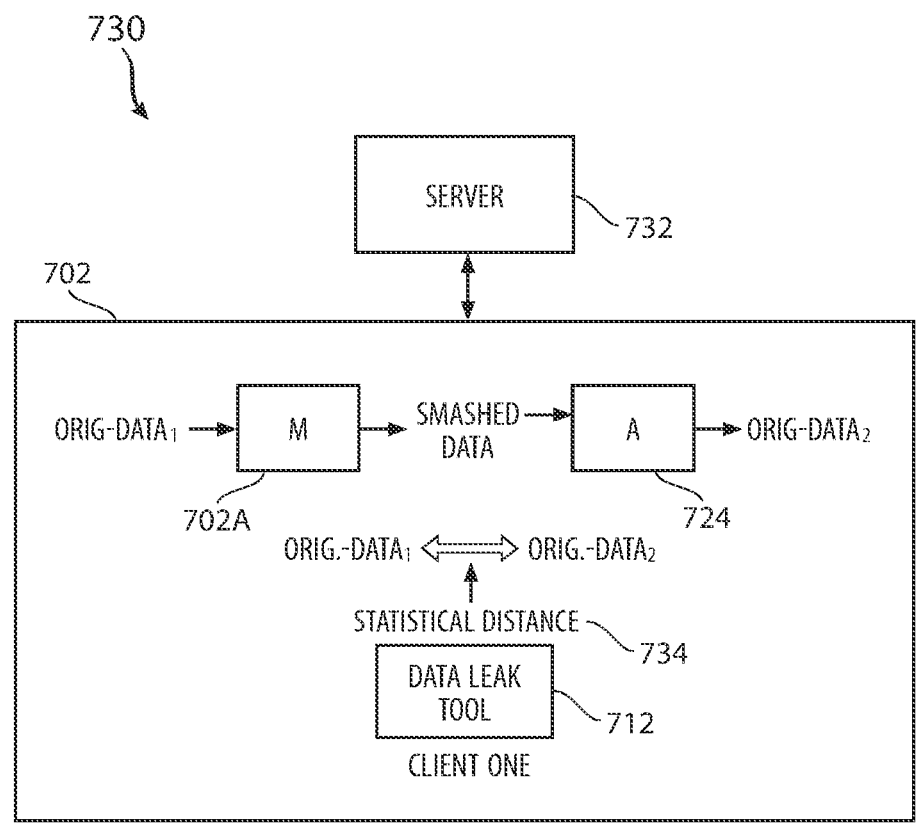
FIG. 7B illustrates an example of using a tool to quantify data leakage from a split layer.

FIG. 7B illustrates the basic approach in a system 730 that uses the tool 712, 714, 716 to quantify data leakage from a split layer 702B, 704B, 706B. The disclosed approach can be applied to any type of federated learning disclosed herein, but is particularly applicable to blind learning. One example client operation is shown for client 702 of FIG. 7A. The client can include a tool 712 with certain functions disclosed herein. A server 710 sends part of a global neural network to the client 702. The part of the global neural network can be referred to as "M". The tool 712 residing at the client's access point, examines M and locates the split layer 702B. The split layer can be at any layer of the global neural network 710A, 702A. The tool 712 reads M and automatically creates an equivalent model A 724 of the same size as M but having opposite operations. In this sense, model A 724 can be considered a mirror image of M 702A. The A network 724 can be called an attack network. The purpose of A 724 is to input smashed data and construct original data. In one aspect, it uses a simple mean squared error function as its objective function but this could change based on the underlying task.

The client 702 starts a separate training task which can be termed a warmup. This process is shown in FIG. 7B. The objective of the warmup is to build a new dataset that consists of the pairs (input image, smashed data) as follows: M (input_image)=smashed data. The input_image can be any orig_data provided to the part of the neural network (M or 702A) and is not limited to image data but can be any kind of data. As shown in FIG. 7B, the input_data operated on by the neural network M outputs the smashed data.

The data pairs are then used to train the attack network A 724: A (smashed data)=input_data. Here, the smashed data is processed to try and reproduce the original data (orig_data2). The system uses statistical distance metric to quantify the statistical distance 734 between the reconstructed images (orig_data2) and the original images (orig_data1). The orig_data2 is generated in an attempt to create a mirror image of orig_data1. Based on a predefined threshold, the system decides whether or not the current location of the split layer 702B is safe for the training process.

If the distance metric is below the threshold, the training process starts. Otherwise, the client 702 declines the task and asks the server 710 to move the split layer 702B deeper into the neural network architecture, or to change the entire architecture in order to approve the training task. This approach has been described with respect to a single client 702 and its tool 712. The same process can occur in other clients as well such as client 704 using its tool 714 to create its attack network 726 or client 706 using its tool 716 to create its attack network 728.

There are a number of varieties of split learning disclosed herein and this approach to quantifying the data leakage at the split layer can apply to any of the disclosed approaches.

Figure 8:
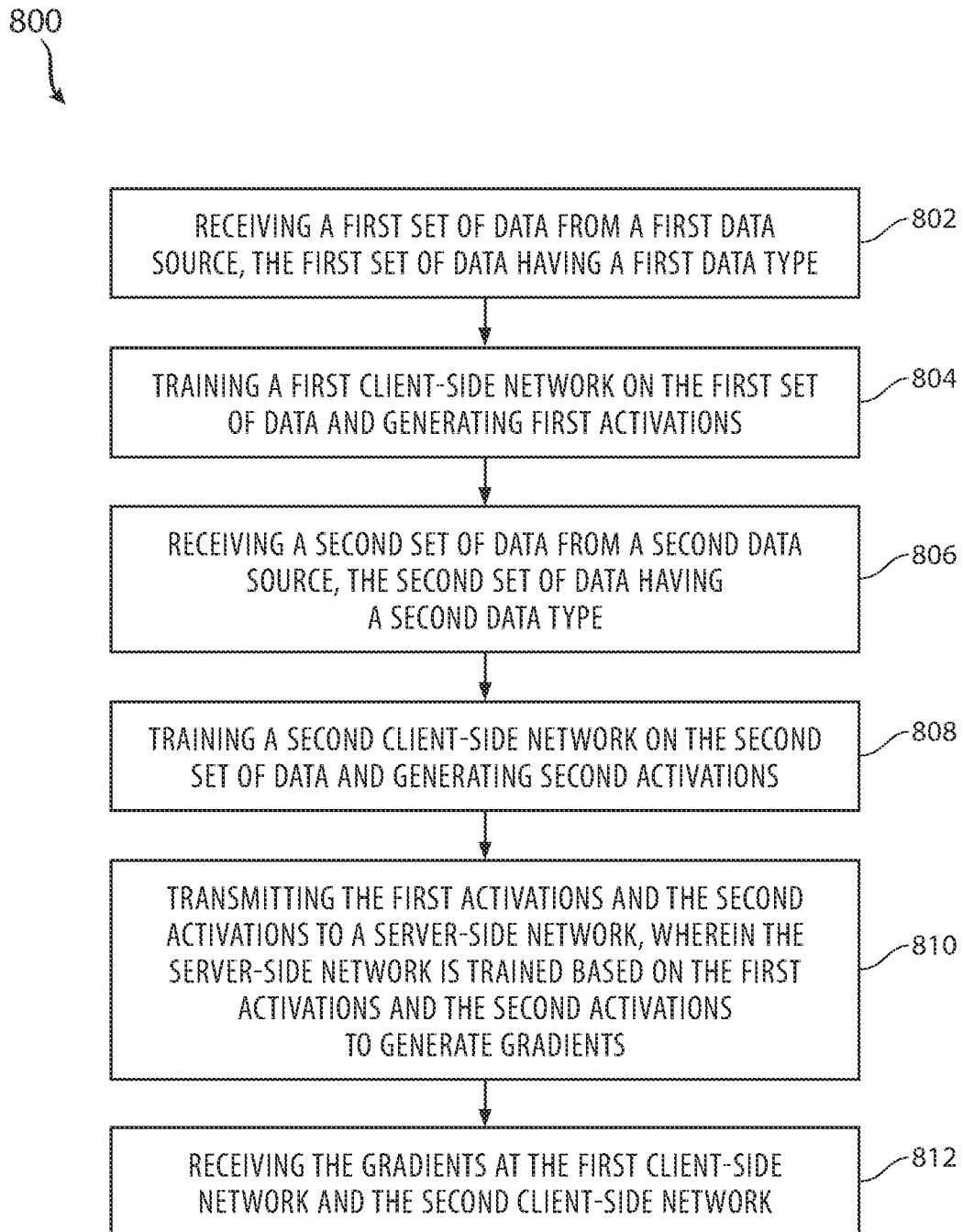
FIG. 8 illustrates a method embodiment.

FIG. 8 illustrate an example method 800 for providing a MMAI concept from the standpoint of the clients. The method includes receiving a first set of data from a first data source, the first set of data having a first data type (802), training a first client-side network on the first set of data and generating first activations (804), receiving a second set of data from a second data source, the second set of data having a second data type (806) and training a second client-side network on the second set of data and generating second activations (808).

The method can further include transmitting the first activations and the second activations to a server-side network, wherein the server-side network is trained based on the first activations and the second activations to generate gradients (810), and receiving the gradients at the first client-side network and the second client-side network (812). The first data type and the second data type can be different data types, such as one being image-based and the other being textual or temporally based as in speech.

Figure 9:
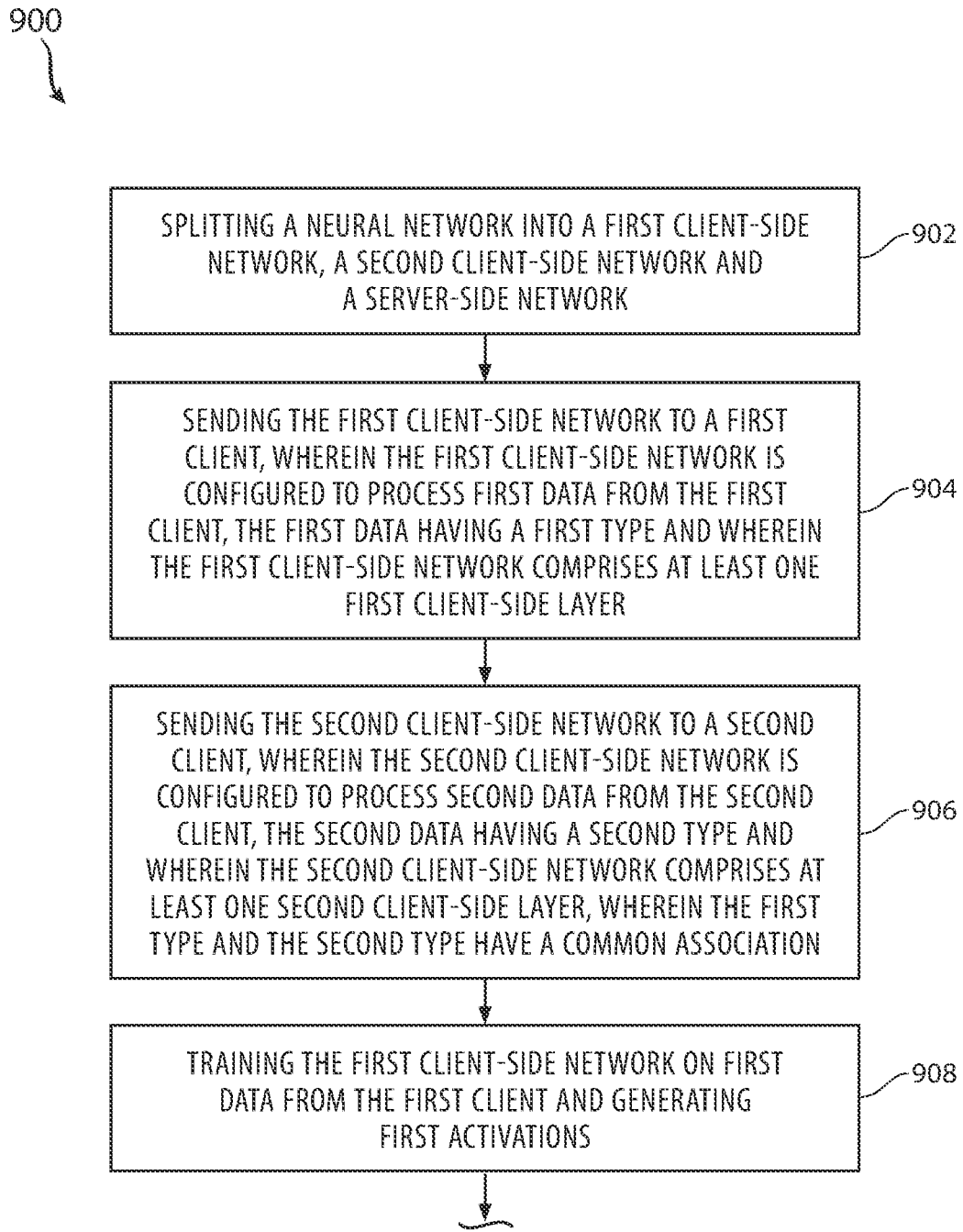
FIG. 9 illustrates a method embodiment.
Figure 9:
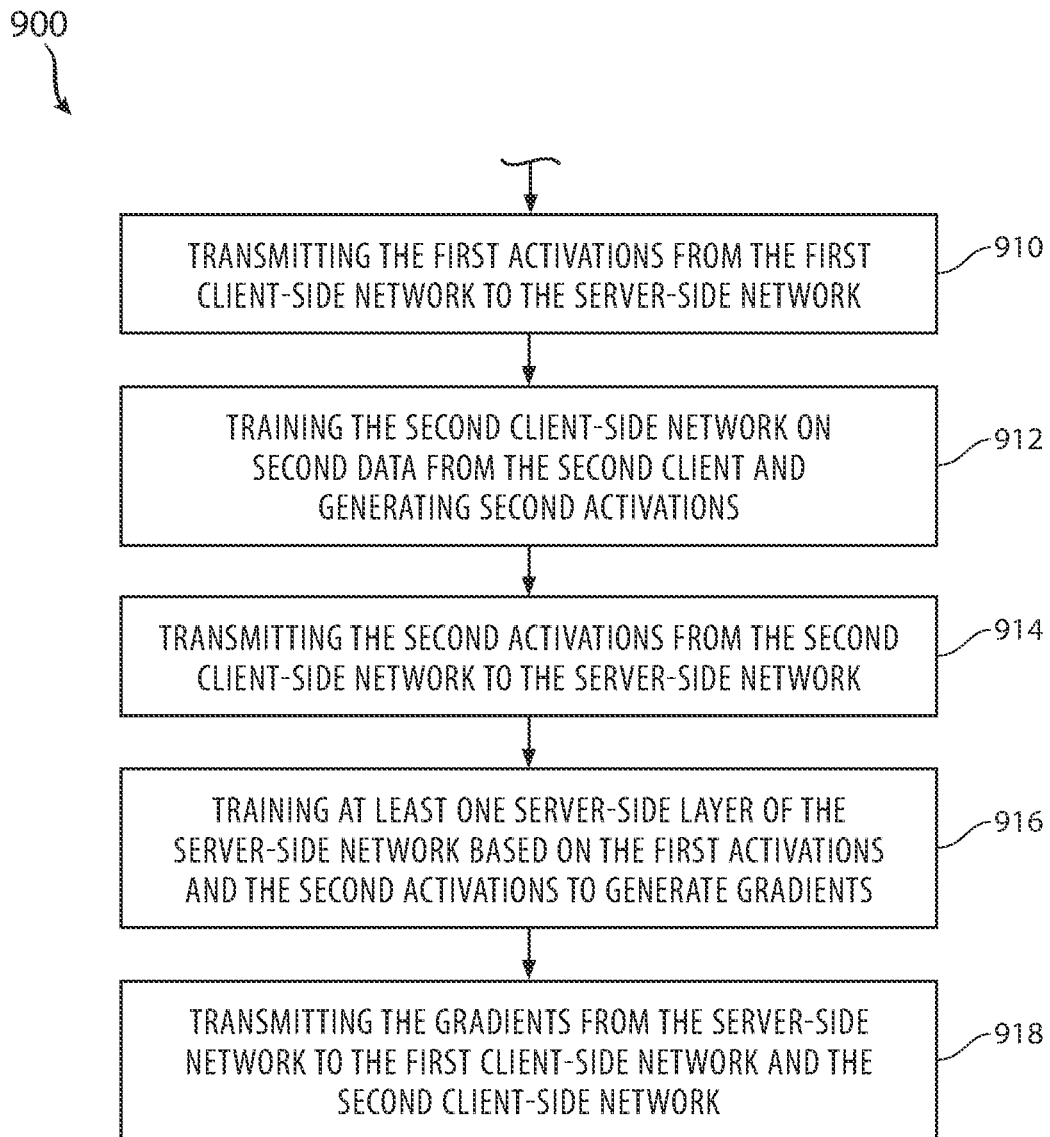

FIG. 9 illustrates an example method 900 from the standpoint of both a server 710 and one or more clients 702, 704, 706. The method can include splitting a neural network into a first client-side network, a second client-side network and a server-side network (902), sending the first client-side network to a first client, wherein the first client-side network is configured to process first data from the first client, the first data having a first type and wherein the first client-side network can include at least one first client-side layer (904), and sending the second client-side network to a second client, wherein the second client-side network is configured to process second data from the second client, the second data having a second type and wherein the second client-side network can include at least one second client-side layer, wherein the first type and the second type have a common association (906).

The method can further include training the first client-side network on first data from the first client and generating first activations (908), transmitting the first activations from the first client-side network to the server-side network (910), training the second client-side network on second data from the second client and generating second activations (912), transmitting the second activations from the second client-side network to the server-side network (914), training at least one server-side layer of the server-side network based on the first activations and the second activations to generate gradients (916) and transmitting the gradients from the server-side network to the first client-side network and the second client-side network (918).

The common association between the disparate types of data can include at least one of a device, a person, a consumer, a patient, a business, a concept, a medical condition, a group of people, a process, a product and/or a service. Any concept, device or person can be the common association or theme of the various disparate types of data that come from different clients and that are processed by different and independent client-side networks up to a cut or split layer. The server-side network can include a global machine learning model. The neural network can include weights, bias and hyperparameters. Hyperparameters typically relate to a parameter whose value is used to control the learning process, such as a topology parameter or a size of a neural network. For example, a learning rate, a mini-batch size, a number of layers on client side, or any parameter related to controlling the process that might impact or relate to different data types can represent a hyperparameter.

The at least one first client-side layer and the at least one second client-side layer each can include a same number of layers or a different number of layers. Because they operate independently, the client-side networks can have a different number of layers as long as they process their data to generate vectors or activations that are in a proper format for passing on to the server-side network for further training. A cut layer can exist between the server-side network and the first client-side network and the second client-side network.

Figure 10:
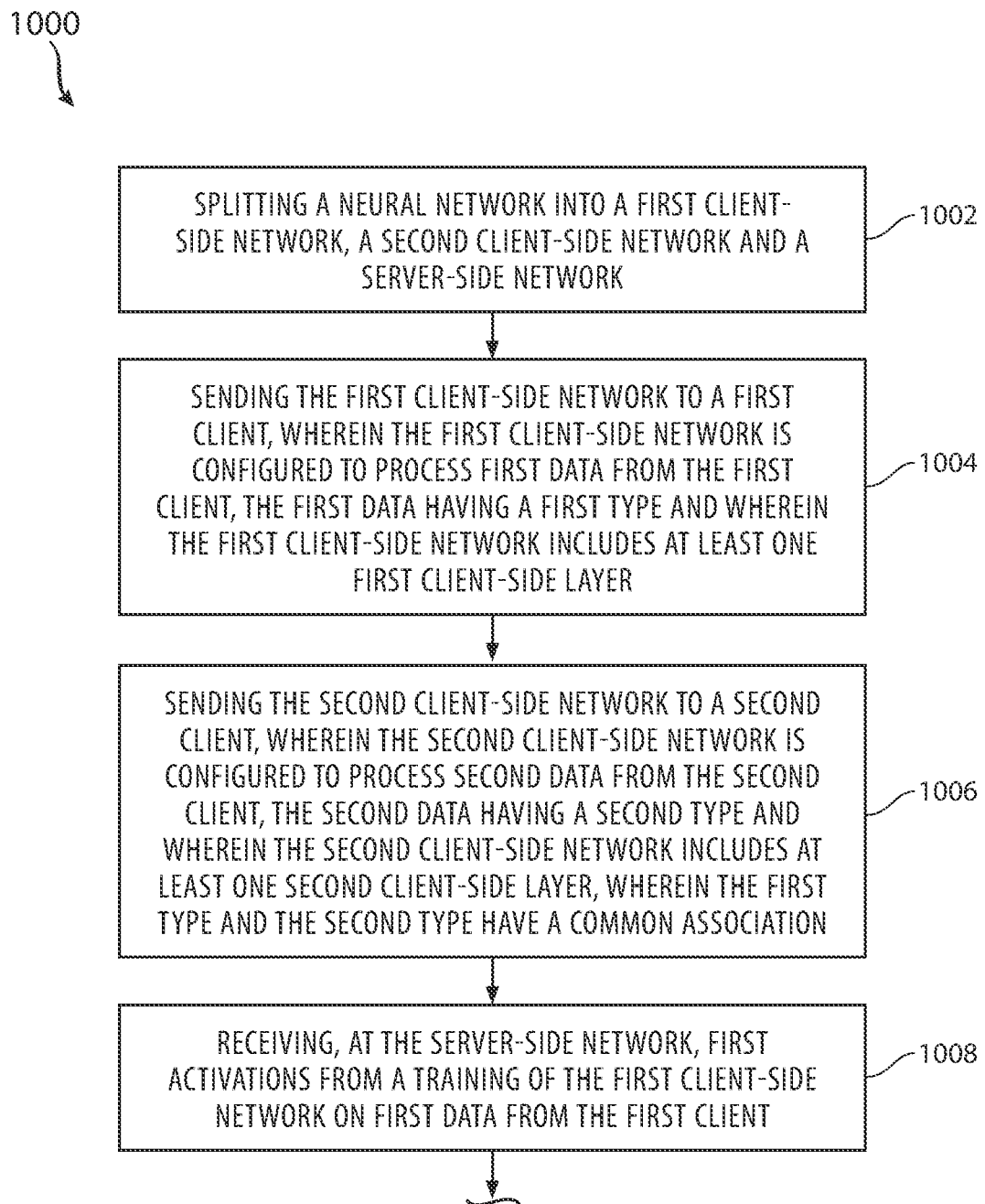
FIG. 10 illustrates a method embodiment.
Figure 10:
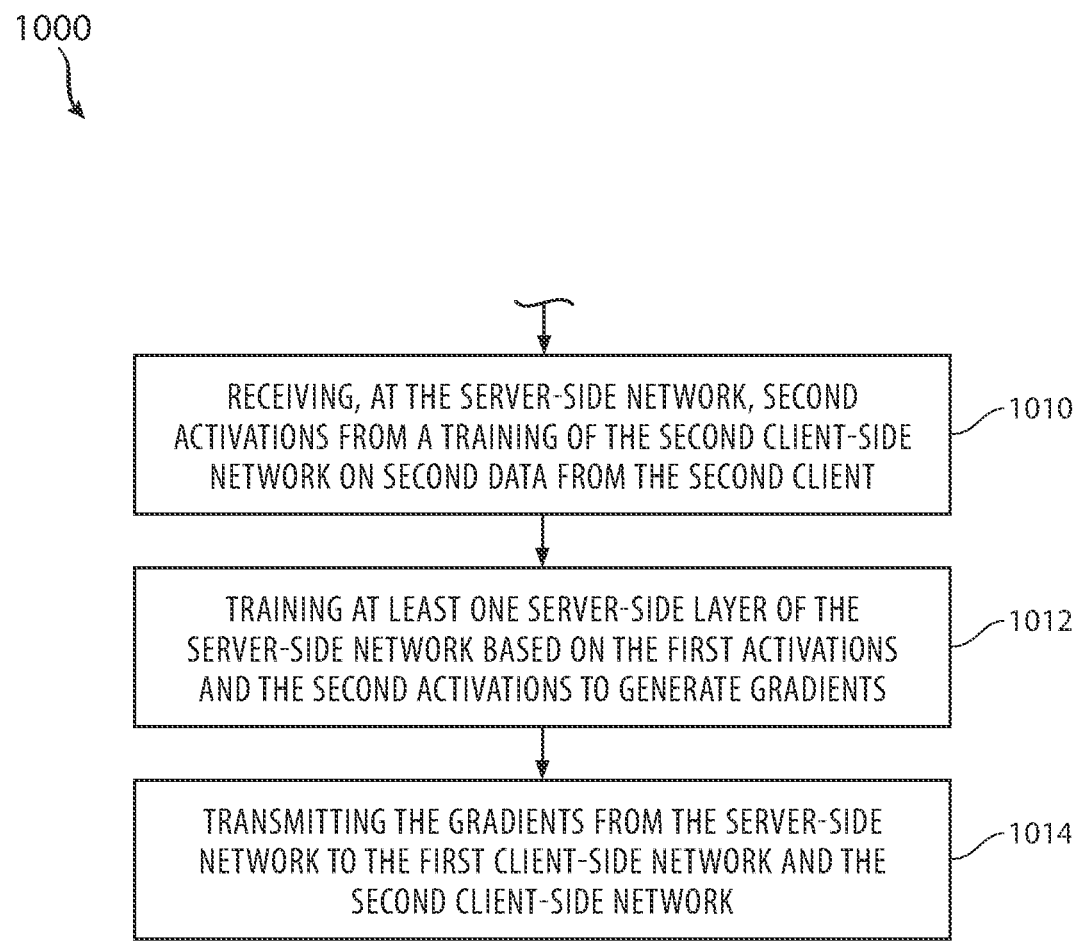

FIG. 10 illustrates an example method 1000 from the standpoint of the server 710. A method can include splitting a neural network into a first client-side network, a second client-side network and a server-side network (1002), sending the first client-side network to a first client, wherein the first client-side network is configured to process first data from the first client, the first data having a first type and wherein the first client-side network can include at least one first client-side layer (1004) and sending the second client-side network to a second client, wherein the second client-side network is configured to process second data from the second client, the second data having a second type and wherein the second client-side network can include at least one second client-side layer, wherein the first type and the second type have a common association (1006).

The method can further include receiving, at the server-side network, first activations from a training of the first client-side network on first data from the first client (1008), receiving, at the server-side network, second activations from a training of the second client-side network on second data from the second client (1010), training at least one server-side layer of the server-side network based on the first activations and the second activations to generate gradients (1012) and transmitting the gradients from the server-side network to the first client-side network and the second client-side network (1014).

Note that in each case, part of the process of the server 710 in terms of training could be perform by the server 710 and other parts such as an averaging of values over the various clients could be performed by a different server (not shown) that could be at a client site, a separate location, or across different clients.

This approach enables the use of the federated split-learning tool set in a new way that when the system splits up the neural network, at the blind correlation 708, the system can make it harder to take the resulting trained model, break it and apply a training inference attack. Because the system can break the neural network in half (or in two portions), and the way it is described above, all that is exchanged from the neural network parts 702A, 704A, 706A is a string or array of numbers, also described as activation layer numbers. Since these are only numbers or an array of characters, what happens at a first neural network portion 702A could be different from what happens at a second neural network portion 704A. For example, the first neural network portion 702A could be 2 layers deep and the second neural network portion 704A could be 90 layers deep. As long as each output resolves to a string of numbers that is structured appropriately for transmission to the top part of the neural network 710, then the forward propagation and the back propagation can work and the training can be achieved. This understanding paves the way for a new concept disclosed herein that different types of data handled across the different portions 702A, 704A, 706A of the neural network can be received and processed properly to train the models ( ) If the system can create a different bottom half 702A, 704A, 706A for each of different clients, then the clients 702, 704, 706 don't have to produce or process the same type of data (between text and images, for example), but the properly formatted neural network portions 702A, 704A, 706A can process that disparate data, and produce the structured output that can be sent to the server 710.

In one example, client one 702 might provide a person's ECG, client two 704 can provide a chest X-ray of a heart can client three 706 can provide the genetic profile of the most four interesting proteins in the patient's blood. If the neural network portions 702A, 704A, 706A can process the different respective types of data down to the right vector structure for output, and provide the disparate types of data to the server 710, the server 710 can be configured with the proper neural network to combine all of that information to train a model to be used to make a diagnosis which can utilize the different and disparate types of data.

In one aspect, while the neural network portions 702A, 704A, 706A each process a different type of data, there is some correlating factor associated with the data. In the above example, all of the data may relate generally to the same person, although some data is ECG related and other data is associated with a genetic profile, yet they all are for the same person. Thus, one aspect of this disclosure is that the data does have a common association. In another aspect, the data may not be related to the same person but the common association could be related to an age, gender, race, project, concept, the weather, the stock market, or other factors. All of the data might relate to women between the ages of 30-35, for example. Thus, the common association has some flexibility to how it would be applied.

In another example, the data could be images from a camera of a jet engine stream, another stream of data could be sensor data, and other data could be flight characteristics from an airplane, and the common association could be the airplane. In another aspect, the common association could be a consumer with one type of data being purchasing habits, another type of data being web-surfing patterns, another type of data being emails that the user sends, another type of data being audio from Siri or other speech processing tools, and another type of data being what physical stores the consumer frequents or what is the user's current location. The output of the server could be an advertisement to provide to the user based on the analysis of the disparate types of input. Thus, the common association can relate to any concept that could be used in which disparate types of data can relate to the concept.

Figure 11A:
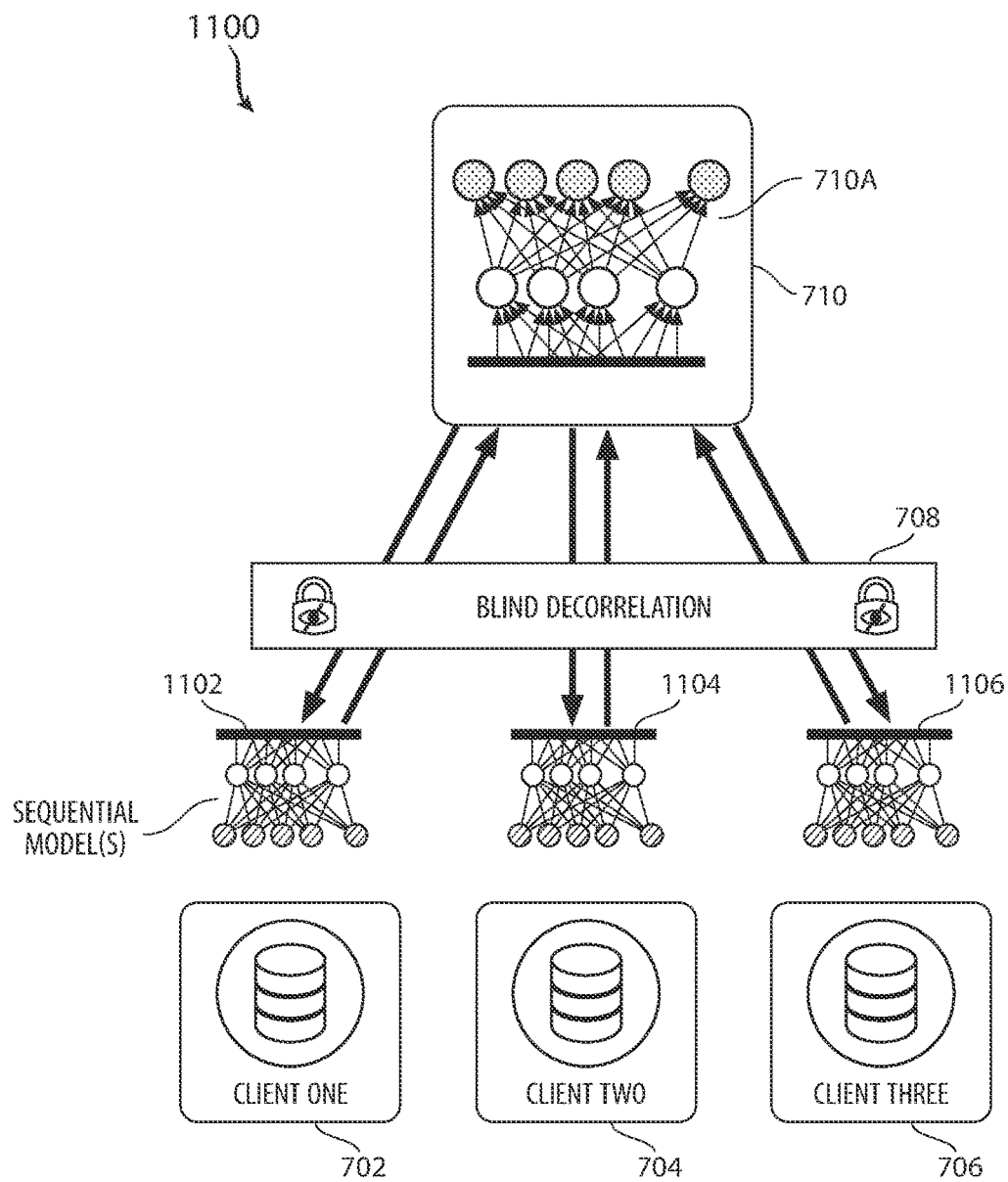
FIG. 11A illustrates using blind correlation across multiple clients with different types of models transmitted to the clients.

FIG. 11A illustrates an example system 1100 that includes a server 710 having a server-side portion of the network 710A and a blind decorrelation approach 708. The client-side portions of the network 1102, 1104, 1106 are shown as being transmitted to various respective clients 702, 704, 706. The different here as introduced above is the use of blind learning built on top of split learning but with a specific feature that enables the method to support sequential models such as RNN, LSTM and GRU, as well as any other sequential models. In this approach, one or more of the client-side portion of the network 1102, 1104, 1106 is a sequential model of some type. For example, the client-side portions of the model 1102, 1106 might be a sequential model or portions of a sequential model. They may be of the same type or may be different types. For example, client-side model 1102 might be an RNN and client-side portion of the model 1106 might be a GRU. The changes disclosed herein enable the ability to support different types of sequential models in blind learning where previously the approach was limited to a small group of neural networks such as a fully-connected network (FC) and a convolutional neural network (CNN). The process includes as part of the training process reducing the dimensionality of the sequential model 1102, 1104, 1106 (which ever one or ones are sequential models) to ensure that the training is viable with the generalized training algorithms provided herein.

Figure 11B:
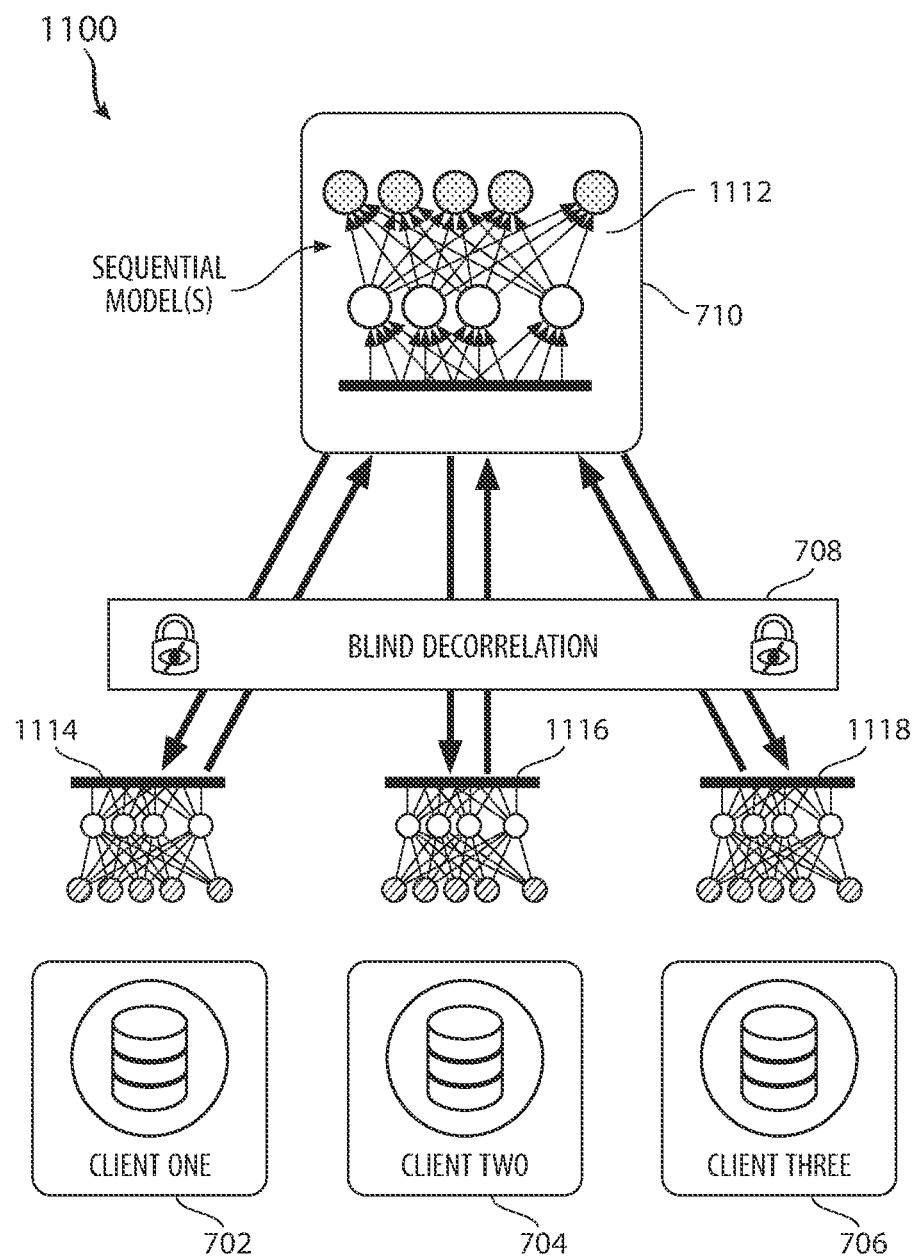
FIG. 11B illustrates another blind correction approach across multiple clients with a sequential model configured at the server.

FIG. 11B illustrates an alternate approach 1100 in which the sequential model is placed at the server side in some cases. Thus, in FIG. 11B, the server-side portion of the network 1112 at the server 710 include all or part of a sequential model or models and the process disclosed herein of reducing the dimensionality of the model occurs on the server 710 and then continuing with the training process.

Figure 12A:
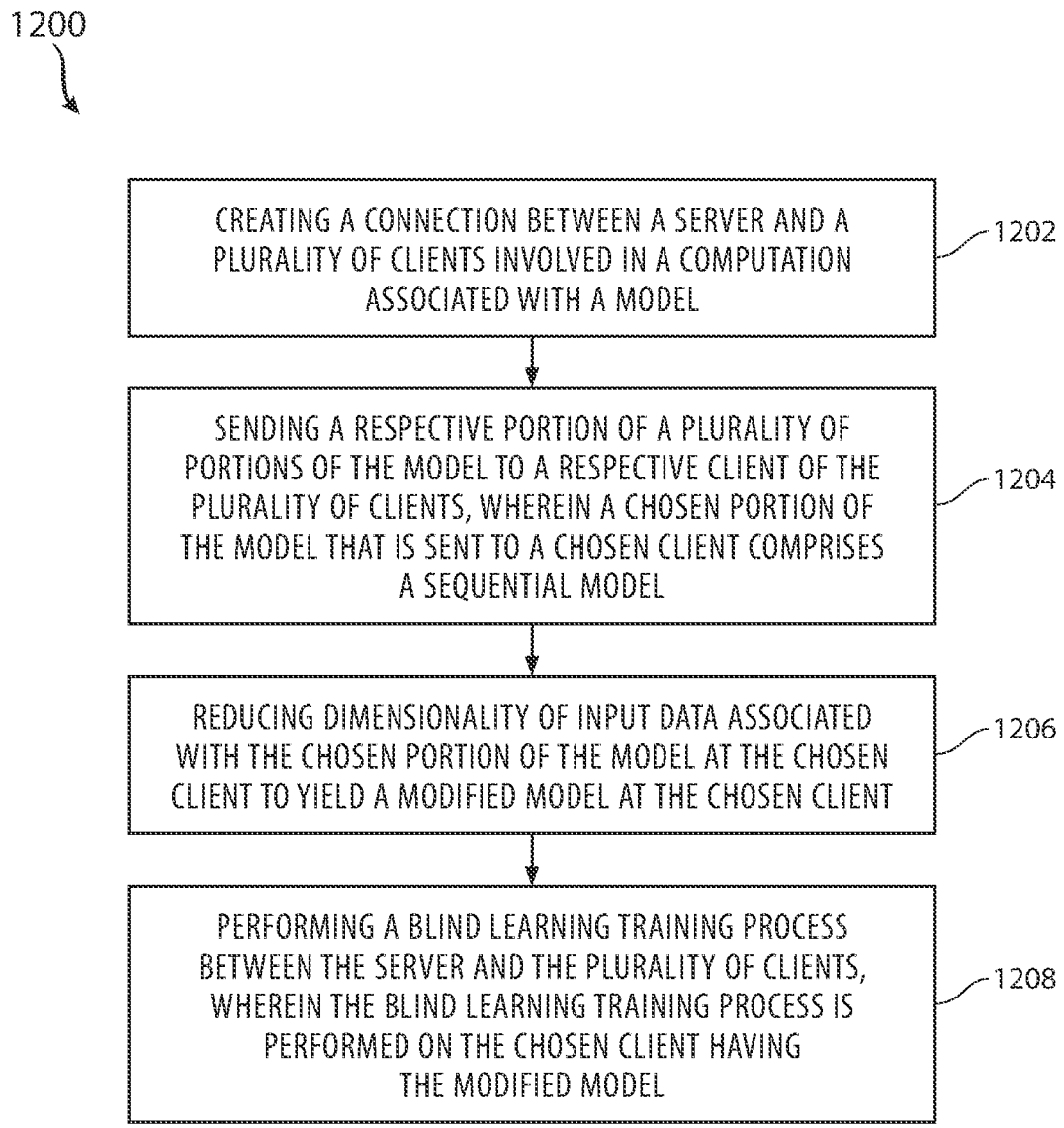
FIG. 12A illustrates a method embodiment related to enabling sequential models to be used within blind learning.

An example method 1200 is disclosed in FIG. 12A and includes creating a connection between a server 710 and a plurality of clients 702, 704, 706 involved in a computation associated with a model (1202), sending a respective portion of a plurality of portions of the model to a respective client of the plurality of clients, wherein a chosen portion of the model that is sent to a chosen client comprises a sequential model (1204), reducing dimensionality of input data associated with the chosen portion of the model at the chosen client to yield a modified model at the chosen client (1206) and performing a blind learning training process between the server and the plurality of clients, wherein the blind learning training process is performed on the chosen client having the modified model (1208). The chosen portion of the plurality of portions contains one of a recurrent neural network (RNN), a long short-term memory (LSTM) model or a gated recurrent units (GRU) model. The chosen portion of the plurality of portions can contain a variable amount of layers.

Each respective portion of the model 1102, 1104, 1106 can include a subset of a full network architecture. A generalized blind learning training process can be performed on all the plurality of clients 702, 704, 706 including the chosen client because the modified model is converted from a high dimension state of the sequential model to a low dimension state.

The step of reducing dimensionality of the sequential model associated with the chosen portion of the model at the chosen client further can include removing a time feature of the sequential model. The step of sending the respective portion of the plurality of portions of the model to the respective client of the plurality of clients further can include sending a second chosen portion of the model is send to a second chosen client and the a second chosen portion of the model comprises a second sequential model.

In another aspect, the method can include reducing dimensionality of the second sequential model associated with the second chosen portion of the model at the second chosen client to yield a second modified model at the second chosen client and performing the blind learning training process between the server and the plurality of clients, wherein the blind learning training process is performed on the chosen client having the modified model and the second chosen client having the second modified model.

The sequential model and the second sequential model can be of a same type of model or a different type of model. There can also be more than just two sequential models that can be of the same type or of different types or different combinations of types of sequential models.

The chosen portion of the model can be part of a plurality of portions of the model in which each of the plurality of portions of the model includes the sequential model.

An example system can include a processor and a computer-readable storage device storing instructions which, when executed by the processor, cause the processor to perform operations including creating a connection between the system and a plurality of clients involved in a computation associated with a model, sending a respective portion of a plurality of portions of the model to a respective client of the plurality of clients, wherein a chosen portion of the model that is sent to a chosen client comprises a sequential model, wherein the chosen client reduces dimensionality of the sequential model associated with the chosen portion of the model to yield a modified model at the chosen client and performing a blind learning training process between the system and the plurality of clients, wherein the blind learning training process is performed on the chosen client having the modified model.

In another aspect, note that the sequential model could be placed at the server side in some cases rather than transferred to one or more clients.

Figure 12B:
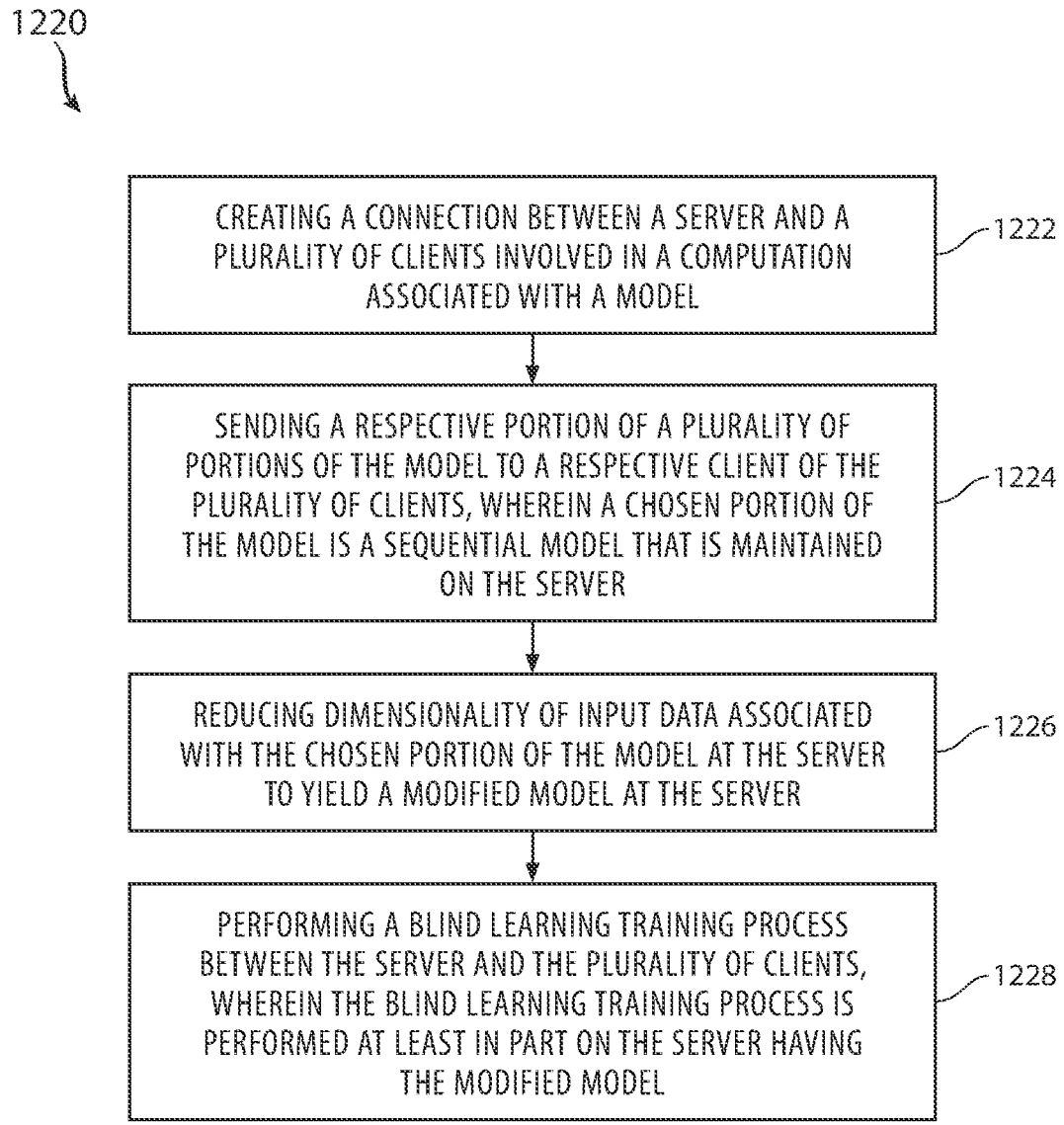
FIG. 12B illustrates another method embodiment related to using sequential models for use in blind learning.

FIG. 12B illustrates a method 1220 related to maintaining the sequential model on the server 710. The method 1220 includes creating a connection between a server 710 and a plurality of clients 702, 704, 706 involved in a computation associated with a model (1222), sending a respective portion of a plurality of portions of the model to a respective client of the plurality of clients, wherein a chosen portion of the model is a sequential model that is maintained on the server (1224), reducing dimensionality of input data associated with the chosen portion of the model at the server to yield a modified model at the server (1226) and performing a blind learning training process between the server and the plurality of clients, wherein the blind learning training process is performed at least in part on the server having the modified model (1228).

As noted above, this disclosure focuses on novel approaches to quantifying data leakage at a split layer. The novelties disclosed herein include a function to read an existing neural network, locate the split layer location, and create an attack network based on this information. See FIG. 7B for these features. An automated mechanism can be implemented through a tool 112 to securely build a new dataset at the client machine 106 of the pairs (input image, smashed data). The data can be image data or any other type of data that is to be processed by the neural network. The usage of different statistical distance metrics can be applied to measure the similarity and differences between the original images and the images reconstructed from smashed data using the attack network. The overall mechanism of deciding whether or not a given neural network is safe enough to train on a given dataset in a decentralized learning paradigm using split learning, blind learning, or any of their variations.

Figure 13:
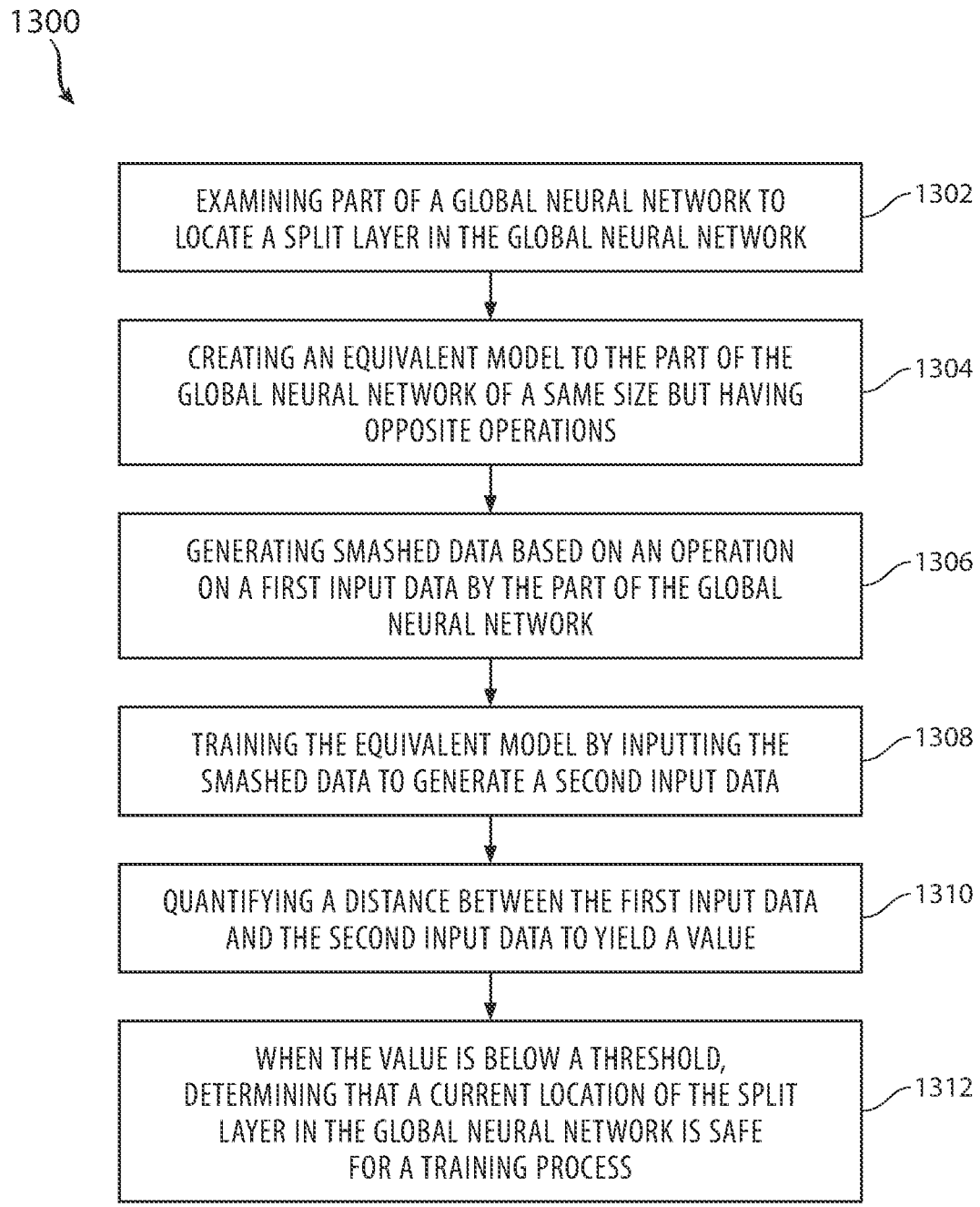
FIG. 13 illustrates a method embodiment.

FIG. 13 illustrates a method 1300 according to an aspect of this disclosure. A server 102 sends the part of the global neural 106A network to a client 106. The method 1300 can include examining part of a global neural network to locate a split layer in the global neural network (1302), creating an equivalent model to the part of the global neural network of a same size but having opposite operations (1304), generating smashed data based on an operation on a first input data by the part of the global neural network (1306), training the equivalent model by inputting the smashed data to generate a second input data (1308), quantifying a distance between the first input data and the second input data to yield a value (1310) and, when the value is below a threshold, determining that a current location of the split layer in the global neural network is safe for a training process (1312).

The equivalent model can apply a mean squared error function or some other function depending on the circumstances or desired outcome. The generating of the smashed data can include a warmup training task of the part of the global neural network.

Note that when the value is below the threshold, the method can include beginning a training process of the global neural network. When the value is at or above the threshold, the method can include declining a training process. The method can further then include requesting from the server 102 to move the split layer deeper into the global neural network.

In another aspect, the method can include changing (by the server 102) an architecture associated with the global neural network prior to approving of a training task.

The client 106 can operate a tool 112 that performs the step of examining part of the global neural network to locate the split layer in the global neural network. The training process can include at least one of a split learning process and a blind learning process.

A system can include a processor and a computer-readable storage device storing instructions which, when executed by the processor, cause the processor to perform operations including examining part of a global neural network to locate a split layer in the global neural network, creating an equivalent model to the part of the global neural network of a same size but having opposite operations, generating smashed data based on an operation on a first input data by the part of the global neural network, training the equivalent model by inputting the smashed data to generate a second input data, quantifying a distance between the first input data and the second input data to yield a value and, when the value is below a threshold, determining that a current location of the split layer in the global neural network is safe for a training process.

Figure 14:
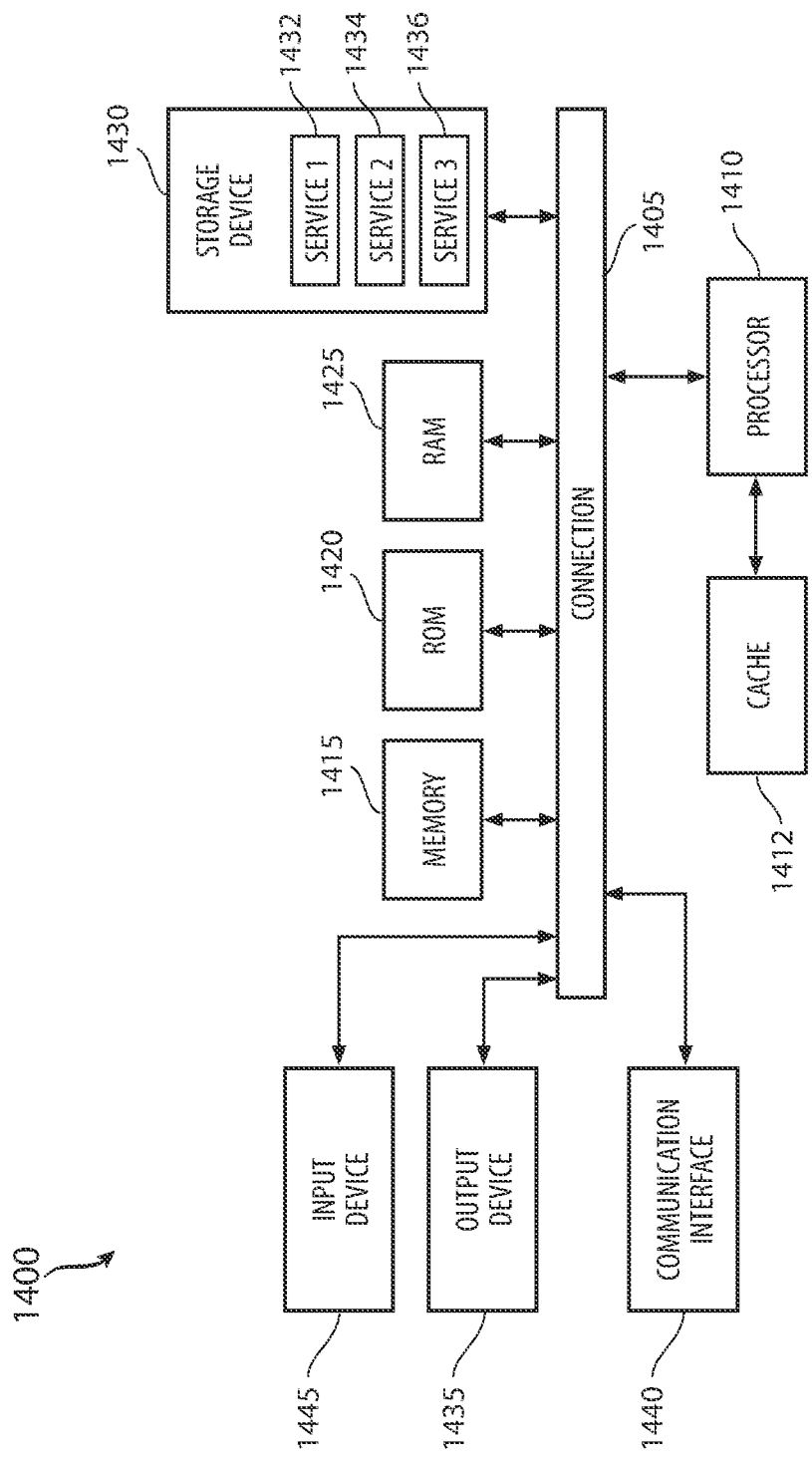
FIG. 14 illustrates a system embodiment.

FIG. 14 illustrates example computer device that can be used in connection with any of the systems disclosed herein. In this example, FIG. 14 illustrates a computing system 1400 including components in electrical communication with each other using a connection 1405, such as a bus. System 1400 includes a processing unit (CPU or processor) 1410 and a system connection 1405 that couples various system components including the system memory 1415, such as read only memory (ROM) 1420 and random access memory (RAM) 1425, to the processor 1410. The system 1400 can include a cache of high-speed memory connected directly with, in close proximity to, or integrated as part of the processor 1410. The system 1400 can copy data from the memory 1415 and/or the storage device 1430 to the cache 1412 for quick access by the processor 1410. In this way, the cache can provide a performance boost that avoids processor 1410 delays while waiting for data. These and other modules can control or be configured to control the processor 1410 to perform various actions. Other system memory 1415 may be available for use as well. The memory 1415 can include multiple different types of memory with different performance characteristics. The processor 1410 can include any general purpose processor and a hardware or software service or module, such as service (module) 1 1432, service (module) 2 1434, and service (module) 3 1436 stored in storage device 1430, configured to control the processor 1410 as well as a special-purpose processor where software instructions are incorporated into the actual processor design. The processor 1410 may be a completely self-contained computing system, containing multiple cores or processors, a bus, memory controller, cache, etc. A multi-core processor may be symmetric or asymmetric.

To enable user interaction with the device 1400, an input device 1445 can represent any number of input mechanisms, such as a microphone for speech, a touch-sensitive screen for gesture or graphical input, keyboard, mouse, motion input, speech and so forth. An output device 1435 can also be one or more of a number of output mechanisms known to those of skill in the art. In some instances, multimodal systems can enable a user to provide multiple types of input to communicate with the device 1400. The communications interface 1440 can generally govern and manage the user input and system output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof.

The storage device 1430 can include services or modules 1432, 1434, 1436 for controlling the processor 1410. Other hardware or software modules are contemplated. The storage device 1430 can be connected to the system connection 1405. In one aspect, a hardware module that performs a particular function can include the software component stored in a computer-readable medium in connection with the necessary hardware components, such as the processor 1410, connection 1405, output device 1435, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
examining part of a global neural network to locate a split layer in the global neural network, the part of the global neural network implementing first operations, wherein the part of the global neural network implementing first operations comprises one or more neural network layers performing a respective function for each respective layer of the one or more neural network layers;
creating an equivalent model to the part of the global neural network of a same size but implementing second operations that are opposite operations in functionality in terms of model inversion and relative to the first operations of the part of the global neural network;
generating smashed data based on a first operation of the first operations on a first input data by the part of the global neural network;
training the equivalent model by inputting the smashed data to generate a second input data using a second operation of the second operations;
quantifying a distance between the first input data and the second input data to yield a value that represents a data leakage level; and
when the value is below a threshold, determining that a current location of the split layer in the global neural network is safe for a future training process for the global neural network.

2. The method of claim 1, wherein the equivalent model applies a mean squared error function.

3. The method of claim 1, wherein the generating of the smashed data comprises a warmup training task of the part of the global neural network.

4. The method of claim 1, wherein, when the value is below the threshold, beginning a training process of the global neural network.

5. The method of claim 1, wherein, when the value is at or above the threshold, declining a training process.

6. The method of claim 5, further comprising requesting to move the split layer deeper into the global neural network.

7. The method of claim 6, further comprising changing an architecture associated with the global neural network prior to approving of a training task.

8. The method of claim 1, wherein a server sends the part of the global neural network to a client.

9. The method of claim 8, wherein the client operates a tool that examines part of the global neural network to locate the split layer in the global neural network.

10. The method of claim 1, wherein training the equivalent model comprises at least one of a split learning process and a blind learning process.

11. A system comprising:
a processor; and
a computer-readable storage device storing instructions which, when executed by the processor, cause the processor to perform operations comprising:
examining part of a global neural network to locate a split layer in the global neural network, the part of the global neural network implementing first operations, wherein the part of the global neural network implementing first operations comprises one or more neural network layers performing a respective function for each respective layer of the one or more neural network layers;
creating an equivalent model to the part of the global neural network of a same size but implementing second operations that are opposite operations in functionality in terms of model inversion and relative to the first operations of the part of the global neural network;

generating smashed data based on a first operation of the first operations on a first input data by the part of the global neural network;

training the equivalent model by inputting the smashed data to generate a second input data using a second operation of the second operations;

quantifying a distance between the first input data and the second input data to yield a value that represents a data leakage level; and when the value is below a threshold, determining that a current location of the split layer in the global neural network is safe for a future training process for the global neural network.

12. The system of claim 11, wherein the equivalent model applies a mean squared error function.

13. The system of claim 11, wherein the generating of the smashed data comprises a warmup training task of the part of the global neural network.

14. The system of claim 11, wherein, when the value is below the threshold, beginning a training process of the global neural network.

15. The system of claim 11, wherein, when the value is at or above the threshold, declining a training process.

16. The system of claim 15, further comprising requesting to move the split layer deeper into the global neural network.

17. The system of claim 16, further comprising changing an architecture associated with the global neural network prior to approving of a training task.

18. The system of claim 11, wherein a server sends the part of the global neural network to a client.

19. The system of claim 18, wherein the client operates a tool that examines part of the global neural network to locate the split layer in the global neural network.

20. The system of claim 11, wherein training the equivalent model comprises at least one of a split learning process and a blind learning process.

* * * * *